United States Patent
Chung et al.

(10) Patent No.: US 8,029,588 B2
(45) Date of Patent: *Oct. 4, 2011

(54) FINE FIBER MEDIA LAYER

(75) Inventors: Hoo Y. Chung, Edina, MN (US); John R. B. Hall, Burnsville, MN (US); Mark A. Gogins, Roseville, MN (US); Douglas G. Crofoot, Burnsville, MN (US); Thomas M. Weik, Deephaven, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/957,813

(22) Filed: Dec. 1, 2010

(65) Prior Publication Data

US 2011/0067369 A1 Mar. 24, 2011

Related U.S. Application Data

(60) Continuation of application No. 12/609,567, filed on Oct. 30, 2009, which is a continuation of application No. 12/008,919, filed on Jan. 14, 2008, now abandoned, which is a continuation of application No. 11/398,788, filed on Apr. 6, 2006, now Pat. No. 7,318,852, which is a continuation of application No. 10/894,848, filed on Jul. 19, 2004, now Pat. No. 7,179,317, which is a division of application No. 10/676,189, filed on Sep. 30, 2003, now Pat. No. 6,924,028, which is a division of application No. 09/871,583, filed on May 31, 2001, now Pat. No. 6,743,273.

(60) Provisional application No. 60/230,138, filed on Sep. 5, 2000.

(51) Int. Cl.
 *B01D 46/00* (2006.01)
(52) U.S. Cl. .............................. 55/486; 55/527; 55/528
(58) Field of Classification Search .................... 55/527, 55/528, 482, 486, 382, 487, 525; 428/36.1, 428/181, 212, 220, 903, 357; 442/340, 351, 442/36
See application file for complete search history.

(56) References Cited

U.S. PATENT DOCUMENTS

| | | | |
|---|---|---|---|
| 567,399 | A | 8/1896 | Laws |
| 2,169,250 | A | 8/1939 | Izard |
| 2,184,947 | A | 12/1939 | Scheel |
| 2,265,742 | A | 12/1941 | Norton |

(Continued)

FOREIGN PATENT DOCUMENTS

CN 1197858 11/1998

(Continued)

OTHER PUBLICATIONS

"Composite-Filter System Improves Static Air Filter System Performance", Donaldson Gas Turbine Systems Brochure (1996) (4 pages).

(Continued)

*Primary Examiner* — Duane Smith
*Assistant Examiner* — Minh-Chau Pham
(74) *Attorney, Agent, or Firm* — Pauly, DeVries Smith & Deffner, L.L.C.

(57) ABSTRACT

Disclosed are improved polymer materials. Also disclosed are fine fiber materials that can be made from the improved polymeric materials in the form of microfiber and nanofiber structures. The microfiber and nanofiber structures can be used in a variety of useful applications including the formation of filter materials.

7 Claims, 18 Drawing Sheets

U.S. PATENT DOCUMENTS

| | | |
|---|---|---|
| 2,338,570 A | 1/1944 | Childs |
| 2,384,947 A | 9/1945 | Matheson |
| 2,443,450 A | 6/1948 | Graham et al. |
| 2,484,523 A | 10/1949 | McClellan |
| 2,835,341 A | 5/1958 | Parker, Jr. |
| 2,980,204 A | 4/1961 | Jordan |
| 3,102,793 A | 9/1963 | Alban |
| 3,236,679 A | 2/1966 | Spiller et al. |
| 3,251,475 A | 5/1966 | Till et al. |
| 3,258,900 A | 7/1966 | Harms |
| 3,284,178 A | 11/1966 | Timmer et al. |
| 3,360,598 A | 12/1967 | Earnhart |
| 3,565,979 A | 2/1971 | Palmer |
| 3,570,675 A | 3/1971 | Pall et al. |
| 3,591,010 A | 7/1971 | Pall et al. |
| 3,596,441 A | 8/1971 | Lundahl |
| 3,689,608 A | 9/1972 | Hollberg et al. |
| 3,745,748 A | 7/1973 | Goldfield et al. |
| 3,755,527 A | 8/1973 | Keller et al. |
| 3,772,136 A | 11/1973 | Workman |
| 3,825,380 A | 7/1974 | Harding et al. |
| 3,839,529 A | 10/1974 | Serres et al. |
| 3,851,023 A | 11/1974 | Brethauer et al. |
| 3,888,610 A | 6/1975 | Brackmann et al. |
| 3,980,605 A | 9/1976 | Steigelmann et al. |
| 3,994,258 A | 11/1976 | Simm |
| 4,011,067 A | 3/1977 | Carey, Jr. |
| 4,020,230 A | 4/1977 | Mahoney et al. |
| 4,032,688 A | 6/1977 | Pall |
| 4,043,331 A | 8/1977 | Martin et al. |
| 4,070,519 A | 1/1978 | Lefkowitz et al. |
| 4,113,912 A | 9/1978 | Okita |
| 4,143,196 A | 3/1979 | Simm et al. |
| 4,148,595 A | 4/1979 | Bednarz |
| 4,210,615 A | 7/1980 | Engler et al. |
| 4,215,682 A | 8/1980 | Kubik et al. |
| 4,223,101 A | 9/1980 | Fine et al. |
| 4,230,650 A | 10/1980 | Guignard |
| 4,278,623 A | 7/1981 | Niegisch |
| 4,290,987 A | 9/1981 | Soehngen et al. |
| 4,323,525 A | 4/1982 | Bornat |
| 4,340,479 A | 7/1982 | Pall |
| 4,370,290 A | 1/1983 | Makino et al. |
| 4,468,428 A | 8/1984 | Early et al. |
| 4,469,606 A | 9/1984 | Reid et al. |
| 4,476,186 A | 10/1984 | Kato et al. |
| 4,594,162 A | 6/1986 | Berger |
| 4,603,083 A | 7/1986 | Tanaka et al. |
| 4,650,506 A | 3/1987 | Barris et al. |
| 4,689,186 A | 8/1987 | Bornat |
| 4,698,194 A | 10/1987 | Tanaka et al. |
| 4,759,782 A | 7/1988 | Miller et al. |
| 4,824,451 A | 4/1989 | Vogt et al. |
| 4,826,519 A | 5/1989 | Miyagi et al. |
| 4,842,505 A | 6/1989 | Annis et al. |
| 4,842,924 A | 6/1989 | Farris et al. |
| 4,860,382 A | 8/1989 | Markwell |
| 4,874,399 A | 10/1989 | Reed et al. |
| 4,878,908 A | 11/1989 | Martin et al. |
| 4,900,671 A | 2/1990 | Pokora et al. |
| 4,915,886 A | 4/1990 | Repetti et al. |
| 4,917,942 A | 4/1990 | Winters |
| 4,929,502 A | 5/1990 | Giglia |
| 4,950,529 A | 8/1990 | Ikeda et al. |
| 4,992,515 A | 2/1991 | Ballard |
| 5,026,591 A | 6/1991 | Henn et al. |
| 5,082,476 A | 1/1992 | Kahlbaugh et al. |
| 5,104,537 A | 4/1992 | Stifelman et al. |
| 5,166,246 A | 11/1992 | Gallucci et al. |
| 5,176,952 A | 1/1993 | Joseph et al. |
| 5,198,294 A | 3/1993 | Masuda et al. |
| 5,203,201 A | 4/1993 | Gogins |
| 5,238,735 A | 8/1993 | Nagou et al. |
| 5,269,925 A | 12/1993 | Broadhurst |
| 5,273,565 A | 12/1993 | Milligan et al. |
| 5,318,831 A | 6/1994 | Hirama et al. |
| 5,340,522 A | 8/1994 | Taniguchi et al. |
| 5,358,638 A | 10/1994 | Gershenson |
| 5,364,456 A | 11/1994 | Kahlbaugh et al. |
| 5,368,734 A | 11/1994 | Wnenchak |
| 5,411,576 A | 5/1995 | Jones et al. |
| 5,437,910 A | 8/1995 | Raabe et al. |
| 5,453,314 A | 9/1995 | Collier et al. |
| 5,466,515 A | 11/1995 | Blauer et al. |
| 5,472,481 A | 12/1995 | Jones et al. |
| 5,496,507 A | 3/1996 | Angadjivand et al. |
| 5,586,997 A | 12/1996 | Pall et al. |
| 5,593,768 A | 1/1997 | Gessner |
| 5,597,645 A | 1/1997 | Pike et al. |
| 5,633,746 A | 5/1997 | Sekiya et al. |
| 5,672,188 A | 9/1997 | Choi |
| 5,672,399 A | 9/1997 | Kahlbaugh et al. |
| 5,717,026 A | 2/1998 | Ikimine et al. |
| 5,763,078 A | 6/1998 | Braun et al. |
| 5,800,586 A | 9/1998 | Cusick et al. |
| 5,806,298 A | 9/1998 | Klosek et al. |
| 5,820,646 A | 10/1998 | Gillingham et al. |
| 5,840,423 A | 11/1998 | Sano et al. |
| 5,843,442 A | 12/1998 | Soule et al. |
| 5,853,442 A | 12/1998 | Glen et al. |
| 5,863,701 A | 1/1999 | Mertesdorf |
| 5,895,510 A | 4/1999 | Butler et al. |
| 5,908,598 A | 6/1999 | Rousseau et al. |
| 5,919,847 A | 7/1999 | Rousseau et al. |
| 5,948,344 A | 9/1999 | Cusick et al. |
| 5,954,849 A | 9/1999 | Berkhoel et al. |
| 5,968,635 A | 10/1999 | Rousseau et al. |
| 5,976,208 A | 11/1999 | Rousseau et al. |
| 5,980,755 A | 11/1999 | Roberts et al. |
| 5,980,759 A | 11/1999 | Proulx et al. |
| 5,981,038 A | 11/1999 | Weimer et al. |
| 5,993,501 A | 11/1999 | Cusick et al. |
| 5,993,580 A | 11/1999 | Nakayama et al. |
| 6,002,017 A | 12/1999 | Rousseau et al. |
| 6,015,764 A | 1/2000 | McCormack et al. |
| 6,032,807 A | 3/2000 | Sternberg et al. |
| 6,037,281 A | 3/2000 | Mathis et al. |
| 6,048,661 A | 4/2000 | Nishi et al. |
| D425,189 S | 5/2000 | Gillingham et al. |
| 6,068,799 A | 5/2000 | Rousseau et al. |
| 6,090,173 A | 7/2000 | Johnson et al. |
| 6,110,249 A | 8/2000 | Medcalf et al. |
| 6,123,751 A | 9/2000 | Nelson et al. |
| 6,134,718 A | 10/2000 | Sesselmann |
| 6,165,572 A | 12/2000 | Kahlbaugh et al. |
| 6,171,684 B1 | 1/2001 | Kahlbaugh et al. |
| 6,192,520 B1 | 2/2001 | Underwood et al. |
| 6,193,773 B1 | 2/2001 | Schlör et al. |
| 6,265,333 B1 | 7/2001 | Dzenis et al. |
| 6,267,998 B1 | 7/2001 | Bauman et al. |
| 6,322,604 B1 | 11/2001 | Midkiff |
| 6,348,432 B1 | 2/2002 | Elmasry |
| 6,354,443 B1 | 3/2002 | Moya |
| 6,395,046 B1 | 5/2002 | Emig et al. |
| 6,514,325 B2 | 2/2003 | Cox et al. |
| 6,554,881 B1 | 4/2003 | Healey |
| 6,604,925 B1 | 8/2003 | Dubson et al. |
| 6,630,016 B2 | 10/2003 | Koslow |
| 6,641,773 B2 | 11/2003 | Kleinmeyer et al. |
| 6,673,136 B2 | 1/2004 | Gillingham et al. |
| 6,716,274 B2 | 4/2004 | Gogins et al. |
| 6,737,447 B1 | 5/2004 | Smith et al. |
| 6,740,142 B2 | 5/2004 | Buettner et al. |
| 6,743,273 B2 | 6/2004 | Chung et al. |
| 6,746,517 B2 | 6/2004 | Benson et al. |
| 6,800,117 B2 | 10/2004 | Barris et al. |
| 6,855,743 B1 | 2/2005 | Gvozdic |
| 6,872,311 B2 | 3/2005 | Koslow |
| 6,875,256 B2 | 4/2005 | Gillingham et al. |
| 6,924,028 B2 | 8/2005 | Chung et al. |
| 6,942,885 B2 | 9/2005 | Ross et al. |
| 6,955,775 B2 | 10/2005 | Chung et al. |
| 6,974,490 B2 | 12/2005 | Gillingham et al. |
| 6,994,742 B2 | 2/2006 | Barris et al. |
| 7,070,640 B2 | 7/2006 | Chung et al. |
| 7,070,715 B2 | 7/2006 | Ashida et al. |
| 7,090,712 B2 | 8/2006 | Gillingham et al. |

| | | | |
|---|---|---|---|
| 7,090,715 B2 | 8/2006 | Chung et al. |
| 7,105,124 B2 | 9/2006 | Choi |
| 7,115,150 B2 | 10/2006 | Johnson et al. |
| 7,147,881 B2 | 12/2006 | Andersen et al. |
| 7,179,317 B2 | 2/2007 | Chung et al. |
| 7,270,692 B2 | 9/2007 | Gillingham et al. |
| 7,270,693 B2 | 9/2007 | Chung et al. |
| 7,316,723 B2 | 1/2008 | Chung et al. |
| 7,318,852 B2 | 1/2008 | Chung et al. |
| 7,318,853 B2 | 1/2008 | Chung et al. |
| 7,318,857 B2 | 1/2008 | Ray et al. |
| 7,618,702 B2 | 11/2009 | Frey et al. |
| 2001/0045086 A1 | 11/2001 | Cox et al. |
| 2002/0084178 A1 | 7/2002 | Dubson et al. |
| 2002/0092423 A1 | 7/2002 | Gillingham et al. |
| 2002/0192468 A1 | 12/2002 | Choi |
| 2003/0088266 A1 | 5/2003 | Bowlin |
| 2003/0140785 A1 | 7/2003 | Koslow |
| 2003/0141261 A1 | 7/2003 | Koslow |
| 2003/0177909 A1 | 9/2003 | Koslow |
| 2003/0195611 A1 | 10/2003 | Greenhalgh et al. |
| 2004/0070118 A1 | 4/2004 | Czado |
| 2004/0080083 A1 | 4/2004 | Czado |
| 2004/0096532 A1 | 5/2004 | Dubson et al. |
| 2004/0131753 A1 | 7/2004 | Smith et al. |
| 2004/0207126 A1 | 10/2004 | Czado |
| 2005/0026526 A1 | 2/2005 | Verdegan et al. |
| 2005/0067732 A1 | 3/2005 | Kim et al. |
| 2005/0235619 A1 | 10/2005 | Heinz et al. |
| 2006/0096260 A1 | 5/2006 | Bryner et al. |
| 2006/0097431 A1 | 5/2006 | Hovanec |
| 2006/0231487 A1 | 10/2006 | Bartley et al. |
| 2008/0047430 A1 | 2/2008 | Kobori |
| 2008/0110822 A1 | 5/2008 | Chung et al. |
| 2009/0064648 A1 | 3/2009 | Chi et al. |
| 2009/0249956 A1 | 10/2009 | Chi et al. |
| 2010/0064645 A1 | 3/2010 | Chung et al. |
| 2010/0175555 A1 | 7/2010 | Ferrer et al. |
| 2010/0178507 A1 | 7/2010 | Ferrer et al. |

FOREIGN PATENT DOCUMENTS

| | | |
|---|---|---|
| DE | 299 07 699 U1 | 9/1999 |
| EP | 0322387 A2 | 6/1989 |
| EP | 0 351 046 A2 | 1/1990 |
| EP | 0 489 395 | 6/1992 |
| EP | 0 811 412 | 12/1997 |
| EP | 1 048 335 | 11/2000 |
| EP | 1 283 283 A1 | 2/2003 |
| EP | 1 409 775 B1 | 2/2003 |
| EP | 1 412 090 B1 | 2/2003 |
| EP | 1 590 066 A2 | 8/2004 |
| GB | 584985 | 1/1947 |
| GB | 745030 | 2/1956 |
| GB | 854987 | 11/1960 |
| GB | 969327 | 9/1964 |
| GB | 1 376 756 | 12/1974 |
| GB | 1 379 875 | 1/1975 |
| JP | 47003712 B | 2/1972 |
| JP | 50075652 A2 | 6/1975 |
| JP | 52081343 A | 7/1977 |
| JP | 62289664 A | 12/1987 |
| JP | 05195322 A2 | 8/1993 |
| JP | 05239778 A2 | 9/1993 |
| JP | 06057530 A2 | 3/1994 |
| JP | 06057531 A2 | 3/1994 |
| JP | 06264301 A2 | 9/1994 |
| NL | 6509765 | 1/1967 |
| RU | 1120043 | 10/1984 |
| WO | WO 94/18364 | 8/1994 |
| WO | WO 98/25709 | 6/1998 |
| WO | WO 99/16532 | 4/1999 |
| WO | WO 99/62705 | 12/1999 |
| WO | WO-9964735 | 12/1999 |
| WO | WO 00/01737 | 1/2000 |
| WO | WO 00/74877 | 12/2000 |
| WO | WO-0108781 | 2/2001 |
| WO | WO 01/51690 | 7/2001 |
| WO | WO 03087443 | 10/2003 |
| WO | WO 2004027140 | 4/2004 |
| WO | WO 2007087049 | 8/2007 |
| WO | WO 2008136581 | 11/2008 |

OTHER PUBLICATIONS

"GDX Pulse Cleaning Filter System: Reliable filter performance in a variety of environments", System Performance, Donaldson Gas Turbine Systems Brochure (1996) (4 pages).

"GDX Self-Cleaning Filter System", Donaldson Filtration Solutions Brochure (2000) (4 pages).

"Replacement Filters for GE/S&S Turbines: Evaluating and Selecting Filter Elements for LM Series Turbines", Donaldson Brochure (1999) (5 pages).

"Standard Test Method for Determining the Initial Efficiency of a Flatsheet Filter Medium in an Airflow Using Latex Spheres", ASTM Designation: F 1215-89 (1989) (9 pages).

European Search Report, EP Patent Application No. 06 014 221.3, dated Oct. 11, 2007 (6 pages).

European Search Report, EP Patent Application No. 07 00 3080, dated Oct. 8, 2007 (5 pages).

European Search Report, EP Patent Application No. 07 021 897.9, dated Apr. 15, 2008 (4 pages).

Filatov, "Electro-Formation of Fibrous Materials (EFF Process), National Science Center of the Russian Federation, Kaprov Institute for Research of Physical Chemistry", pp. 152-155, 162-165, 168-171 (1997) (15 pages).

International Search Report, International Application No. PCT/US01/24948, mailed May 12, 2003 (13 pages).

International Search Report, International Application No. PCT/US2005/039793, mailed May 8, 2007 (9 pages).

Rogovin, "Principles of Chemical Fibers Chemistry and Technology", Moscow Publishing House "Khimiya",vol. II, pp. 16-19 (1974).

Li et al., "Modification of Air Filter Media With Nylon-6 Nanofibers", Journal of Engineered Fibers and Fabrics, 1(1):1-22 (2006).

Adanur, S. et al., "Recovery and Reuse of Waste PVC Coated Fabrics. Part 1: Experimental Procedures and Separation of Fabric Components", Jour. of Coated Fabrics, vol. 28, pp. 37-55 (Jul. 1998).

Angelo, R. et al., "Preparation and Characterization of Selectively Isotopically Labeled Nylon 66 Polymers", Macromolecules, vol. 22, pp. 117-121 (1989).

Basutkar, P. et al., "Synthesis and Characterization of Phenylated Aromatic Poly(amide-amides)s", Jour. of Applied Polymer Science, vol. 68, pp. 1523-1530 (1998).

Baumgarten, P., "Electrostatic Spinning of Acrylic Microfibers", Jour. of Colloid and Interface Science, vol. 36, No. 1, 9 pages (May 1971).

Benavente, J. et al., "Electrical Properties of Modified Aromatic Polyamide Membranes", Separation Science and Technology, vol. 32, No. 13, pp. 2189-2199 (1997).

Bognitzki, M. et al., "Polymer, Metal and Hybrid Nano- and Mesotubes by Coating of Degradable Polymer Template Fibers (Turf-process)", Philipps-University Marburg, Department of Chemistry, Mainz, Germany, pp. 45 and 46 (Date Unknown).

Bognitzki, M. et al., "Submicrometer Shaped Polylactide Fibers by Electrospinning", Philipps-University Marburg, Department of Chemistry, Mainz, Germany, pp. 115 and 116 (Date Unknown).

Chun, I. et al., "Carbon Nanofibers from Polyacrylonitrile and Mesophase Pitch", Jour. of Advanced Materials, vol. 31, No. 1, pp. 36-41 (Jan. 1999).

Declaration of Doug Crofoot with Exhibits A and B, dated Sep. 10, 2001.

Deitzel, J. et al., "Generation of Polymer Nanofibers Through Electrospinning", Army Research Labm Aberdeen Proving Ground, MD 21005-5066, ARL-TR-1898, pp. 1-36 (Jun. 1999).

Dhawan, S. et al., Conducting Fabrics as a Shield Against Electromagnetic Interference (EMI), Jour. of Coated Fabrics, vol. 28, pp. 29-36 (Jul. 1998).

Donaldson Brochure, Donaldson® Gas Turbine Systems, DZ2000™ Panel Filters with Spider-Web® Filter Media, 4 pages (1997).

Donaldson Brochure, Eon™ Fine Fiber Technology by Donaldson, 6 pages (1999).

Donaldson® Brochure, Filtration Solutions for Gas Turbines, Generators, and Compressors, "DZ2000 Air Filter Media, The Longer Life, Higher Value Filter Media for Gas Turbine Inlet Air Filter Systems", 4 pages (Dec. 2000).

Donaldson® Brochure, Tech Topics, "Do Spider-Web Replacement Filters Really 'Cost' Extra? Analysis Shows How Savings form High Performance Far Outweigh a Premium Price", 2 pages (Jul. 1999).

Donaldson® Brochure, Ultra-Web® "Premium Quality-High Efficiency Filters", 4 pages (1994).

Doshi, J., "The Electrospinning Process and Applications of Electrospun Fibers", *UMI Dissertation Services*, University of Akron, pp. 1-170, including sections (Aug. 1994).

Fang, X., "Application of Electrospinning for Polymers", *UMI Dissertation Services*, University of Akron, pp. 1-168, including sections (Aug. 1997).

Gibson, P. et al., "Electrospinning Technology: Direct Application of Tailorable Ultrathin Membranes", Jour. of Coated Fabrics, vol. 28, pp. 63-72 (Jul. 1998).

Giessmann, A. et al., "Multipurpose Production Line for the Coated Textile Industry", *Jour. of Coated Fabrics*, vol. 28, pp. 56-62 (Jul. 1998).

Horiike, S. et al., "Preparation of Chemically Crosslinked Gels with Maleate-Denatured Poly(vinyl alcohol) and its Application to Drug Release," *Journal of Applied Polymer Science*, vol. 84, pp. 1178-1184 (2002).

Huang, M. et al., "The Modification of Nylon 6 by a Phenol-Formaldehyde Resin", *Jour. of Applied Polymer Science*, vol. 48, pp. 563-572 (1993).

Huang, P. "Modification of Nylon 6 by Phenol-Containing Polymers", *Jour. of Applied Polymer Science*, vol. 73, pp. 295-300 (1999).

Huang, R. et al., "Crosslinked Blended Poly(vinyl alcohol)/N-Methylol Nylon-6 Membranes for the Pervaporation Separation of Ethanol-Water Mixtures", *Jour. of Applied Polymer Science*, vol. 70, pp. 317-327 (1998).

Kim, J. et al., "Polybenzimidazole Nanofiber Produced by Electrospinning", *Polymer Engineering and Science*, vol. 39, No. 5, pp. 849-854 (May 1999).

Kirichenko, V. et al., "Domains of Existence of Free, Stationary Liquid Jets in a Strong External Electric Field", *Sov. Phys. Dokl.*, vol. 32, No. 7, pp. 544-547 (Jul. 1987).

Kirichenko, V. et al., "Shape of a Free, Stationary Liquid Jet in a Strong Uniform Electric Field", *Sov. Phys. Dokl*, vol. 32, No. 7, pp. 546-547 (Jul. 1987).

Kirichenko, V. et al., "Charge Transfer due to the Electrohydrodynamic Atomization of a Liquid", *Sov. Phys. Dokl.*, vol. 33, No. 8, pp. 564-566 (Aug. 1988).

Kirichenko, V. et al., "Transverse Splitting of a Liquid Jet in a Strong Electric Field", *Sov. Phys. Dokl.*, vol. 33, No. 9, pp. 653-654 (Sep. 1988).

Kirichenko, V. et al., "Acceleration of a Free Jet of Low-conducting Liquid in an Electric Field", *Sov. Phys. Dokl.*, vol. 35, No. 12, pp. 1018-1020 (Dec. 1990).

Kirichenko, V. et al., "Specific Charge of the Liquid in Electrohydrodynamic Atomization and Microfilament Forming Processes", *Sov. Phys. Dokl*, vol. 35, No. 12, pp. 1015-1020 (Dec. 1990).

Kirichenko, V. et al., "Gas Flow and Filtration Through Permeable Channel Walls", *Phys. Dokl.*, vol. 38, No. 4, pp. 139-141 (Apr. 1993).

Mahajan, S. et al., "Fibrillation Behavior of Oriented Tapes of Polyethylene and Its Blends. IV", *Jour. of Applied Polymer Science*, vol. 60, pp.1151-1560 (1996).

Marijnissen, J., "Electrosprays with Applications in Aerosol Technology and Material Synthesis", 1994 International Aerosol Conference Tutorial Sessions, Los Angeles, California, pp. 1-67 (Aug. 29, 1994).

Maslowski, E. et al., "New Processes for Fiber-Like PE Structures", *Fiber World*, pp. 12-14 (Mar. 1987).

National Textile Center, "Electrostatic Spinning and Properties of Ultrafine Fibers", http://www.ntcresearch.org/currently/year8/M98-DO1.htm, last updated May 19, 1999, pp. 1-4.

Ohzawa, Y. et al., "Studies on Dry Spinning. I. Fundamental Equations", *Jour. of Applied Polymer Science*, vol. 13, pp. 257-283 (1969).

Ohzawa, Y. et al., "Studies on Dry Spinning. II. Numerical Solutions for Some Polymer-Solvent Systems Based on the Assumption that Drying is Controlled by Boundary-Layer Mass Transfer", *Jour. of Applied Polymer Science*, vol. 14, pp. 1879-1899 (1970).

Oleinik, V. et al., "Formation of ester bonds during the thermal treatment of fibers from mixtures of poly(vinyl alcohol) and polyacrylic acid," *Khimicheskaya Promyshlennost Ukrainy*, Russian Edition vol. 3, abstract page only (1968).

Petryanov, I. et al., "Adhesion of Finely Dispersed Particles to the Surface of Coating Materials", *Translated from Doklady Akademii Nauk SSSR*, vol. 288, No. 5, pp. 515-551, Original Article submitted Jul. 3, 1985.

Reneker, D. et al, "Nanometre diameter fibres of polymer, produced by electrospinning," *Nanotechnology*, vol. 7, pp. 216-223 (1996).

SBCCOM-Natick Public Affairs, "Army Teams with Universities to Develop Electrospun Membranes and Fabrics for Soldier Protection", http://www.Natick.army.mil/pao/1998/98-26.htm, last updated Oct. 27, 2000, pp. 1-2.

Shambaugh, R., "A Macroscopic View of the Melt-Blowing Process for Producing Microfibers", *Ind. Eng. Chem. Res.*, vol. 27, No. 12, pp. 2363-2372 (1988).

Shepelev, A. et al., "Polymeric Fiber Materials for Fine Cleaning of Gases", *J. Aerosol Sci., Suppl. 1*, vol. 26, pp. 5919-5920, (1995).

Shieh, J. et al., "Preparation of N-Methylol Nylon-6 Membranes for Pervaporation of Ethanol-Water Mixtures", *Department of Chemical Engineering*, University of Waterloo, Ontario N2L 3G1, Canada, pp. 855-863 (Received Jun. 24, 1996).

Sioen, J., "The Coating Company of the Future", *Jour. of Coated Fabrics*, vol. 28, pp. 73-79 (Jul. 1998).

Smith, J., "Cellulose Acetate Fibrets: a Fibrillated Pulp with High Surface Area", *Tappi Journal*, pp. 185-193 (Dec. 1988).

Smith, R. et al., "Phase Behavior and Reaction of Nylon 6/6 in Water at High Temperatures and Pressures", *Jour. of Applied Polymer Science*, vol. 76, pp. 1062-1073 (2000).

Supplemental Declaration of Douglas G. Crofoot filed in U.S. Appl. No. 09/871,156, filed Aug. 1998.

"Survey of Soluble Polyamide Patents", RT-2488-R, pp. 1-6 (Oct. 14, 1954).

Taylor, G., "Viscosity and Molecular Weight of Nylon, The Relation of the Viscosity of Nylon Solutions in Formic Acid to Molecular Weight as Determined by End-Group Measurements", *Contribution From The Chemical Department, Experimental Station, E.I. Du Pont De Nemours & Company*, pp. 635-637 (Mar. 1947).

Wadsworth, L. et al., "Development of Highly Breathable and Effective Blood/Viral Barrier Laminates of Microporous Films, Staple Fibers and Nonwovens", *Jour. of Coated Fabrics*, vol. 28, pp. 12-28 (Jul. 1998).

Wang, F. et al. "Hydrogen Bonding in Polyamide Toughened Novolac Type Phenolic Resin", *Jour. of Applied Polymer Science*, vol. 74, pp. 2283-2289 (1999).

Wang, H. et al., "Synthesis and Properties of Nylon 6 Modified with Various Aromatic Polyamides", *Jour. of Applied Polymer Science*, vol. 68, pp. 1031-1043 (1998).

Wente, V., "Superfine Thermoplastic Fibers", *Industrial and Bio Chemistry*, Naval Research Laboratory, Washington 25, D.C., vol. 48, No. 8, pp. 1342-1346 (Aug. 1986).

Yao, L. et al., "Electrospinning and Stablization of Fully Hydrolyzed Poly(Vinyl Alcohol) Fibers," *Chemistry of Materials*, vol. 15, No. 9, pp. 1860-1864 (May 6, 2003).

Zeng, J. et al., "Processing Parameters for Electrospun Poly(Vinyl Alcohol) (PVA) Nanofibers and Photo-Mediated Crosslinking of Modified PVA Nanofibers," *Polymer Preprints*, vol. 44, No. 2, pp. 174-175 (2003).

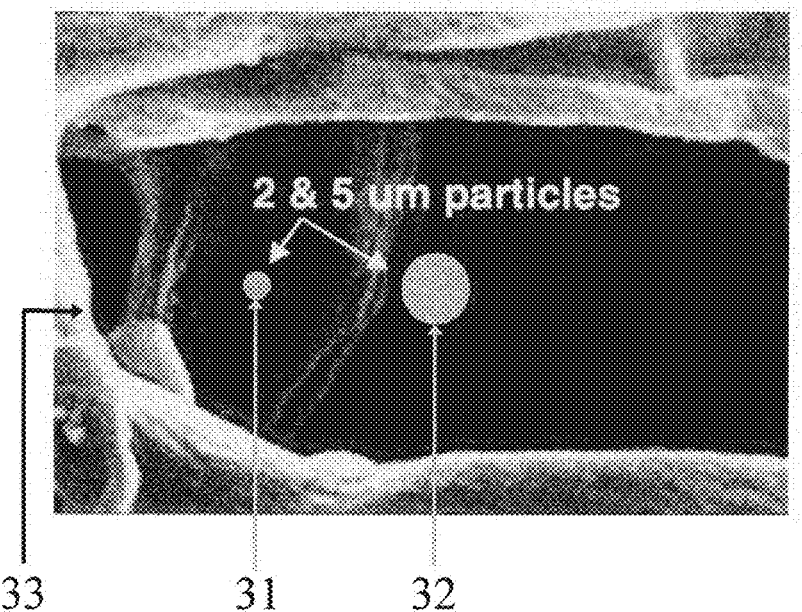
FIG. 3A  Cellulose Media
2,000 X Scanning Electron Microscope Images
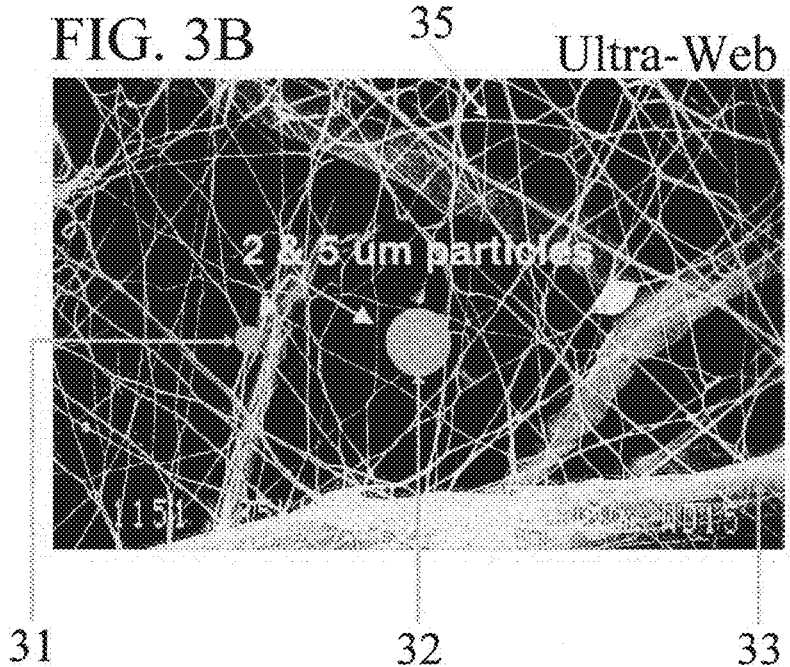
FIG. 3B  Ultra-Web

FINE FIBER MEDIA LAYER

CROSS-REFERENCE TO RELATED APPLICATION

This application is a continuation application of Ser. No. 12/609,567, filed Oct. 30, 2009, which is a continuation application of Ser. No. 12/008,919, filed Jan. 14, 2008, now abandoned, which is a continuation application of Ser. No. 11/398,788, filed Apr. 6, 2006, now U.S. Pat. No. 7,318,852, which is a continuation of application Ser. No. 10/894,848, filed Jul. 19, 2004, now U.S. Pat. No. 7,179,317, which is a divisional of application Ser. No. 10/676,189, filed Sep. 30, 2003, now U.S. Pat. No. 6,924,028, which application is a divisional of application Ser. No. 09/871,583, filed May 31, 2001, now U.S. Pat. No. 6,743,273, which claims the benefit of provisional application Ser. No. 60/230,138, filed Sep. 5, 2000, which applications are incorporated herein by reference.

FIELD OF THE INVENTION

The invention also relates to polymer materials can be manufactured with improved environmental stability to heat, humidity, reactive materials and mechanical stress. Such materials can be used in the formation of fine fibers such as microfibers and nanofiber materials with improved stability and strength. As the size of fiber is reduced the survivability of the materials is increasingly more of a problem. Such fine fibers are useful in a variety of applications. In one application, filter structures can be prepared using this fine fiber technology. The invention relates to polymers, polymeric composition, fiber, filters, filter constructions, and methods of filtering. Applications of the invention particularly concern filtering of particles from fluid streams, for example from air streams and liquid (e.g. non-aqueous and aqueous) streams. The techniques described concern structures having one or more layers of fine fibers in the filter media. The compositions and fiber sizes are selected for a combination of properties and survivability.

BACKGROUND OF THE INVENTION

The invention relates to polymeric compositions with improved properties that can be used in a variety of applications including the formation of fibers, microfibers, nanofibers, fiber webs, fibrous mats, permeable structures such as membranes, coatings or films. The polymeric materials of the invention are compositions that have physical properties that permit the polymeric material, in a variety of physical shapes or forms, to have resistance to the degradative effects of humidity, heat, air flow, chemicals and mechanical stress or impact. The invention also pertains generally to the field of filter-type media for the filtration of fluids including gaseous and liquid materials. The filter media includes at least a micro- or nanofiber web layer in combination with a substrate material in a mechanically stable filter structure. These layers together provide excellent filtering, high particle capture, efficiency at minimum flow restriction when a fluid such as a gas or liquid passes through the filter media. The substrate can be positioned in the fluid stream upstream, downstream or in an internal layer. A variety of industries have directed substantial attention in recent years to the use of filtration media for filtration, i.e. the removal of unwanted particles from a fluid such as gas or liquid. The common filtration process removes particulate from fluids including an air stream or other gaseous stream or from a liquid stream such as a hydraulic fluid, lubricant oil, fuel, water stream or other fluids. Such filtration processes require the mechanical strength, chemical and physical stability of the microfiber and the substrate materials. The filter media can be exposed to a broad range of temperature conditions, humidity, mechanical vibration and shock and both reactive and non-reactive, abrasive or non-abrasive particulates entrained in the fluid flow. Further, the filtration media often require the self-cleaning ability of exposing the filter media to a reverse pressure pulse (a short reversal of fluid flow to remove surface coating of particulate) or other cleaning mechanism that can remove entrained particulate from the surface of the filter media. Such reverse cleaning can result in substantially improved (i.e.) reduced pressure drop after the pulse cleaning. Particle capture efficiency typically is not improved after pulse cleaning, however pulse cleaning will reduce pressure drop, saving energy for filtration operation. Such filters can be removed for service and cleaned in aqueous or non-aqueous cleaning compositions. Such media are often manufactured by spinning fine fiber and then forming an interlocking web of microfiber on a porous substrate. In the spinning process the fiber can form physical bonds between fibers to interlock the fiber mat into a integrated layer. Such a material can then be fabricated into the desired filter format such as cartridges, flat disks, canisters, panels, bags and pouches. Within such structures, the media can be substantially pleated, rolled or otherwise positioned on support structures.

In making non-woven fine fiber filter media, a variety of materials have been used including fiberglass, metal, ceramics and a wide range of polymeric compositions. A variety of techniques have been used for the manufacture of small diameter micro- and nanofibers. One method involves passing the material through a fine capillary or opening either as a melted material or in a solution that is subsequently evaporated. Fibers can also be formed by using "spinnerets" typical for the manufacture of synthetic fiber such as nylon. Electrostatic spinning is also known. Such techniques involve the use of a hypodermic needle, nozzle, capillary or movable emitter. These structures provide liquid solutions of the polymer that are then attracted to a collection zone by a high voltage electrostatic field. As the materials are pulled from the emitter and accelerate through the electrostatic zone, the fiber becomes very thin and can be formed in a fiber structure by solvent evaporation.

As more demanding applications are envisioned for filtration media, significantly improved materials are required to withstand the rigors of high temperature 100° F. to 250° F. and up to 300° F., high humidity 10% to 90% up to 100% RH, high flow rates of both gas and liquid, and filtering micron and submicron particulates (ranging from about 0.01 to over 10 microns) and removing both abrasive and non-abrasive and reactive and non-reactive particulate from the fluid stream.

Accordingly, a substantial need exists for polymeric materials, micro- and nanofiber materials and filter structures that provide improved properties for filtering streams with higher temperatures, higher humidities, high flow rates and said micron and submicron particulate materials.

SUMMARY OF THE INVENTION

The invention provides an improved polymeric material. This polymer has improved physical and chemical stability. The polymer fine fiber (microfiber and nanofiber) can be fashioned into useful product formats. Nanofiber is a fiber with diameter less than 200 nanometers or 0.2 micron. Microfiber is a fiber with diameter larger than 0.2 micron, but not larger than 10 microns. This fine fiber can be made in the form of an improved multi-layer microfiltration media structure. The fine fiber layers of the invention comprise a random distribution of fine fibers which can be bonded to form an interlocking net. Filtration performance is obtained largely as a result of the fine fiber barrier to the passage of particulate. Structural properties of stiffness, strength, pleatability are provided by the substrate to which the fine fiber adhered. The fine fiber interlocking networks have as important characteristics, fine fibers in the form of microfibers or nanofibers and relatively small spaces between the fibers. Such spaces typically range, between fibers, of about 0.01 to about 25 microns or often about 0.1 to about 10 microns. The filter products comprising a fine fiber layer and a cellulosic layer are thin with a choice of appropriate substrate. The fine fiber adds less than a micron in thickness to the overall fine fiber plus substrate filter media. In service, the filters can stop incident particulate from passing through the fine fiber layer and can attain substantial surface loadings of trapped particles. The particles comprising dust or other incident particulates rapidly form a dust cake on the fine fiber surface and maintain high initial and overall efficiency of particulate removal. Even with relatively fine contaminants having a particle size of about 0.01 to about 1 micron, the filter media comprising the fine fiber has a very high dust capacity.

The polymer materials as disclosed herein have substantially improved resistance to the undesirable effects of heat, humidity, high flow rates, reverse pulse cleaning, operational abrasion, submicron particulates, cleaning of filters in use and other demanding conditions. The improved microfiber and nanofiber performance is a result of the improved character of the polymeric materials forming the microfiber or nanofiber. Further, the filter media of the invention using the improved polymeric materials of the invention provides a number of advantageous features including higher efficiency, lower flow restriction, high durability (stress related or environmentally related) in the presence of abrasive particulates and a smooth outer surface free of loose fibers or fibrils. The overall structure of the filter materials provides an overall thinner media allowing improved media area per unit volume, reduced velocity through the media, improved media efficiency and reduced flow restrictions.

A preferred mode of the invention is a polymer blend comprising a first polymer and a second, but different polymer (differing in polymer type, molecular weight or physical property) that is conditioned or treated at elevated temperature. The polymer blend can be reacted and formed into a single chemical specie or can be physically combined into a blended composition by an annealing process. Annealing implies a physical change, like crystallinity, stress relaxation or orientation. Preferred materials are chemically reacted into a single polymeric specie such that a Differential Scanning calorimeter analysis reveals a single polymeric material. Such a material, when combined with a preferred additive material, can form a surface coating of the additive on the microfiber that provides oleophobicity, hydrophobicity or other associated improved stability when contacted with high temperature, high humidity and difficult operating conditions. The fine fiber of the class of materials can have a diameter of 2 microns to less than 0.01 micron. Such microfibers can have a smooth surface comprising a discrete layer of the additive material or an outer coating of the additive material that is partly solubilized or alloyed in the polymer surface, or both. Preferred materials for use in the blended polymeric systems include nylon 6; nylon 66; nylon 6-10; nylon (6-66-610) copolymers and other linear generally aliphatic nylon compositions. A preferred nylon copolymer resin (SVP-651) was analyzed for molecular weight by the end group titration. (J. E. Walz and G. B. Taylor, determination of the molecular weight of nylon, Anal. Chem. Vol. 19, Number 7, pp 448-450 (1947). A number average molecular weight ($W_n$) was between 21,500 and 24,800. The composition was estimated by the phase diagram of melt temperature of three component nylon, nylon 6 about 45%, nylon 66 about 20% and nylon 610 about 25%. (Page 286, Nylon Plastics Handbook, Melvin Kohan ed. Hanser Publisher, New York (1995)).

Reported physical properties of SVP 651 resin are:

| Property | ASTM Method | Units | Typical Value |
| --- | --- | --- | --- |
| Specific Gravity | D-792 | — | 1.08 |
| Water Absorption (24 hr immersion) | D-570 | % | 2.5 |
| Hardness | D-240 | Shore D | 65 |
| Melting Point | DSC | ° C.(° F.) | 154 (309) |
| Tensile Strength @ Yield | D-638 | MPa (kpsi) | 50 (7.3) |
| Elongation at Break | D-638 | % | 350 |
| Flexural Modulus | D-790 | MPa (kpsi) | 180 (26) |
| Volume Resistivity | D-257 | ohm-cm | $10^{12}$ |

A polyvinylalcohol having a hydrolysis degree of from 87 to 99.9+% can be used in such polymer systems. These are preferably cross linked. And they are most preferably crosslinked and combined with substantial quantities of the oleophobic and hydrophobic additive materials.

Another preferred mode of the invention involves a single polymeric material combined with an additive composition to improve fiber lifetime or operational properties. The preferred polymers useful in this aspect of the invention include nylon polymers, polyvinylidene chloride polymers, polyvinylidene fluoride polymers, polyvinylalcohol polymers and, in particular, those listed materials when combined with strongly oleophobic and hydrophobic additives that can result in a microfiber or nanofiber with the additive materials formed in a coating on the fine fiber surface. Again, blends of similar polymers such as a blend of similar nylons, similar polyvinylchloride polymers, blends of polyvinylidene chloride polymers are useful in this invention. Further, polymeric blends or alloys of differing polymers are also contemplated by the invention. In this regard, compatible mixtures of polymers are useful in forming the microfiber materials of the invention. Additive composition such a fluoro-surfactant, a nonionic surfactant, low molecular weight resins (e.g.) tertiary butylphenol resin having a molecular weight of less than about 3000 can be used. The resin is characterized by oligomeric bonding between phenol nuclei in the absence of methylene bridging groups. The positions of the hydroxyl and the tertiary butyl group can be randomly positioned around the rings. Bonding between phenolic nuclei always occurs next to hydroxyl group, not randomly. Similarly, the polymeric material can be combined with an alcohol soluble non-linear polymerized resin formed from bis-phenol A. Such material is similar to the tertiary butylphenol resin described above in that it is formed using oligomeric bonds that directly connect aromatic ring to aromatic ring in the absence of any bridging groups such as alkylene or methylene groups.

A particularly preferred material of the invention comprises a microfiber material having a dimension of about 2 to 0.01 microns. The most preferred fiber size range between 0.05 to 0.5 micron. Such fibers with the preferred size provide excellent filter activity, ease of back pulse cleaning and other aspects. The highly preferred polymer systems of the invention have adhering characteristic such that when contacted with a cellulosic substrate adheres to the substrate with sufficient strength such that it is securely bonded to the substrate and can resist the delaminating effects of a reverse pulse cleaning technique and other mechanical stresses. In such a mode, the polymer material must stay attached to the substrate while undergoing a pulse clean input that is substantially equal to the typical filtration conditions except in a reverse direction across the filter structure. Such adhesion can arise from solvent effects of fiber formation as the fiber is contacted with the substrate or the post treatment of the fiber on the substrate with heat or pressure. However, polymer characteristics appear to play an important role in determining adhesion, such as specific chemical interactions like hydrogen bonding, contact between polymer and substrate occurring above or below Tg, and the polymer formulation including additives. Polymers plasticized with solvent or steam at the time of adhesion can have increased adhesion.

An important aspect of the invention is the utility of such microfiber or nanofiber materials formed into a filter structure. In such a structure, the fine fiber materials of the invention are formed on and adhered to a filter substrate. Natural fiber and synthetic fiber substrates, like spun bonded fabrics, non-woven fabrics of synthetic fiber and non-wovens made from the blends of cellulosics, synthetic and glass fibers, non-woven and woven glass fabrics, plastic screen like materials both extruded and hole punched, UF and MF membranes of organic polymers can be used. Sheet-like substrate or cellulosic non-woven web can then be formed into a filter structure that is placed in a fluid stream including an air stream or liquid stream for the purpose of removing suspended or entrained particulate from that stream. The shape and structure of the filter material is up to the design engineer. One important parameter of the filter elements after formation is its resistance to the effects of heat, humidity or both. One aspect of the filter media of the invention is a test of the ability of the filter media to survive immersion in warm water for a significant period of time. The immersion test can provide valuable information regarding the ability of the fine fiber to survive hot humid conditions and to survive the cleaning of the filter element in aqueous solutions that can contain substantial proportions of strong cleaning surfactants and strong alkalinity materials. Preferably, the fine fiber materials of the invention can survive immersion in hot water while retaining at least 50% of the fine fiber formed on the surface of the substrate. Retention of at least 50% of the fine fiber can maintain substantial fiber efficiency without loss of filtration capacity or increased back pressure. Most preferably retaining at least 75%.

A fine fiber filter structure includes a bi-layer or multi-layer structure wherein the filter contains one or more fine fiber layers combined with or separated by one or more synthetic, cellulosic or blended webs. Another preferred motif is a structure including fine fiber in a matrix or blend of other fibers.

We believe important characteristics of the fiber and microfiber layers in the filter structure relate to temperature resistance, humidity or moisture resistance and solvent resistance, particularly when the microfiber is contacted with humidity, moisture or a solvent at elevated temperatures. Further, a second important property of the materials of the invention relates to the adhesion of the material to a substrate structure. The microfiber layer adhesion is an important characteristic of the filter material such that the material can be manufactured without delaminating the microfiber layer from the substrate, the microfiber layer plus substrate can be processed into a filter structure including pleats, rolled materials and other structures without significant delamination. We have found that the heating step of the manufacturing process wherein the temperature is raised to a temperature at or near but just below melt temperature of one polymer material, typically lower than the lowest melt temperature substantially improves the adhesion of the fibers to each other and the substrate. At or above the melt temperature, the fine fiber can lose its fibrous structure. It is also critical to control heating rate. If the fiber is exposed to its crystallization temperature for extended period of time, it is also possible to lose fibrous structure. Careful heat treatment also improved polymer properties that result from the formation of the exterior additive layers as additive materials migrate to the surface and expose hydrophobic or oleophobic groups on the fiber surface.

The criteria for performance is that the material be capable of surviving intact various operating temperatures, i.e. a temperature of 140° F., 160° F., 270° F., 300° F. for a period of time of 1 hour or 3 hours, depending on end use, while retaining 30%, 50%, 80% or 90% of filter efficiency. An alternative criteria for performances that the material is capable of surviving intact at various operating temperatures, i.e. temperatures of 140° F., 160° F., 270° F., 300° F., for a period of time of 1 hours or 3 hours depending on end use, while retaining, depending on end use, 30%, 50%, 80% or 90% of effective fine fibers in a filter layer. Survival at these temperatures is important at low humidity, high humidity, and in water saturated air. The microfiber and filter material of the invention are deemed moisture resistant where the material can survive immersion at a temperature of greater than 160° F. while maintaining efficiency for a time greater than about 5 minutes. Similarly, solvent resistance in the microfiber material and the filter material of the invention is obtained from a material that can survive contact with a solvent such as ethanol, a hydrocarbon, a hydraulic fluid, or an aromatic solvent for a period of time greater than about 5 minutes at 70° F. while maintaining 50% efficiency.

The fine fiber materials of the invention can be used in a variety of filter applications including pulse clean and non-pulse cleaned filters for dust collection, gas turbines and engine air intake or induction systems; gas turbine intake or induction systems, heavy duty engine intake or induction systems, light vehicle engine intake or induction systems; Z filter; vehicle cabin air; off road vehicle cabin air, disk drive air, photocopier-toner removal; HVAC filters in both commercial or residential filtration applications.

BRIEF DESCRIPTION OF THE DRAWINGS

FIG. 3 is a depiction of the typical internal structure of a support material and a separate depiction of the fine fiber material of the invention compared to small, i.e. 2 and 5 micron particulate materials.

DETAILED DESCRIPTION OF THE INVENTION

Figure 1:
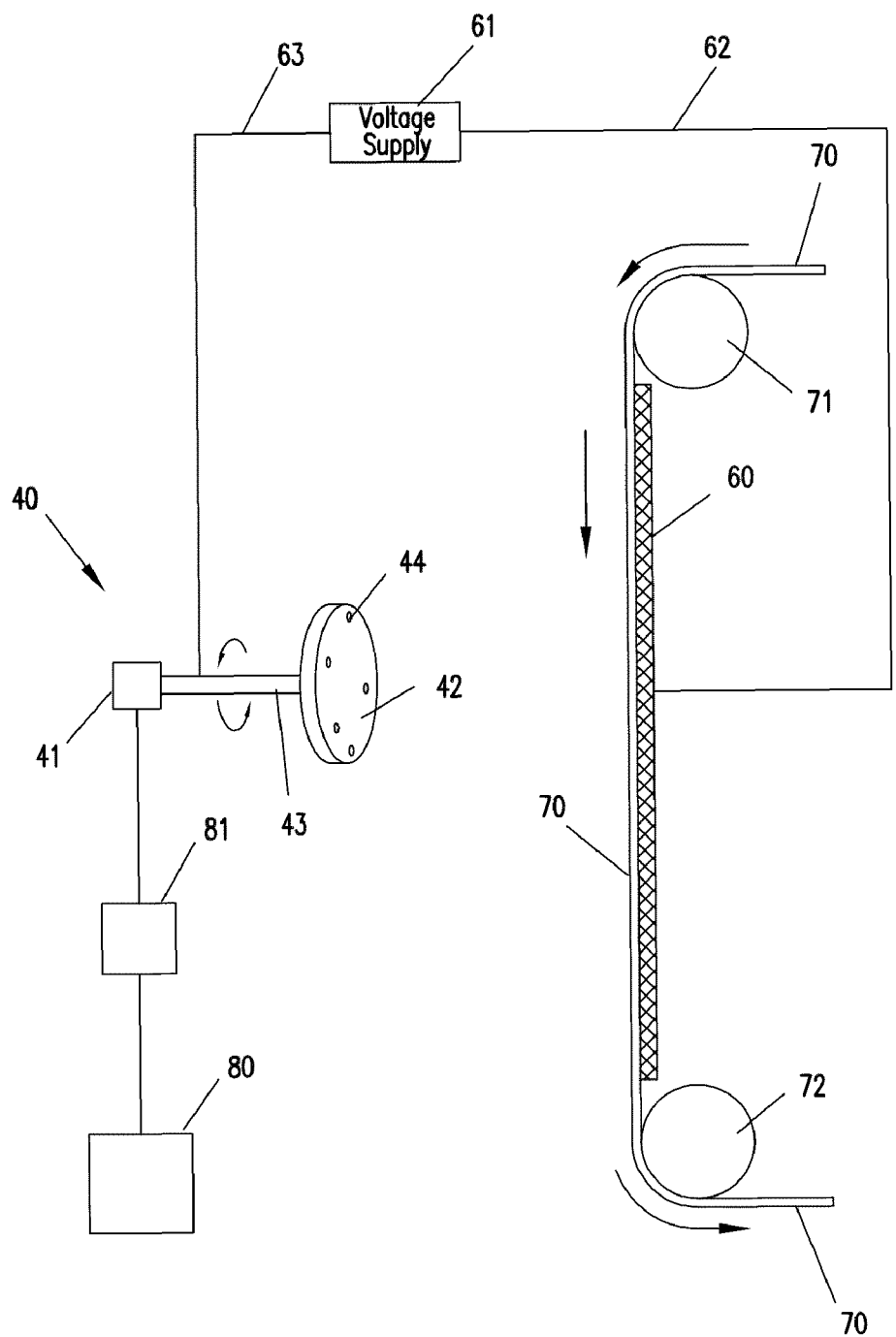
FIG. 1 depicts a typical electrostatic emitter driven apparatus for production of the fine fibers of the invention.

The fine fibers that comprise the micro- or nanofiber containing layer of the invention can be fiber and can have a diameter of about 0.001 to 2 micron, preferably 0.05 to 0.5 micron. The thickness of the typical fine fiber filtration layer ranges from about 1 to 100 times the fiber diameter with a basis weight ranging from about 0.01 to 240 micrograms-$cm^{-2}$.

Fluid streams such as air and gas streams often carry particulate material therein. The removal of some or all of the particulate material from the fluid stream is needed. For example, air intake streams to the cabins of motorized vehicles, air in computer disk drives, HVAC air, clean room ventilation and applications using filter bags, barrier fabrics, woven materials, air to engines for motorized vehicles, or to power generation equipment; gas streams directed to gas turbines; and, air streams to various combustion furnaces, often include particulate material therein. In the case of cabin air filters it is desirable to remove the particulate matter for comfort of the passengers and/or for aesthetics. With respect to air and gas intake streams to engines, gas turbines and combustion furnaces, it is desirable to remove the particulate material because particulate can cause substantial damage to the internal workings to the various mechanisms involved. In other instances, production gases or off gases from industrial processes or engines may contain particulate material therein. Before such gases can be, or should be, discharged through various downstream equipment to the atmosphere, it may be desirable to obtain a substantial removal of particulate material from those streams.

A general understanding of some of the basic principles and problems of air filter design can be understood by consideration of the following types of filter media: surface loading media; and, depth media. Each of these types of media has been well studied, and each has been widely utilized. Certain principles relating to them are described, for example, in U.S. Pat. Nos. 5,082,476; 5,238,474; and 5,364,456. The complete disclosures of these three patents are incorporated herein by reference.

The "lifetime" of a filter is typically defined according to a selected limiting pressure drop across the filter. The pressure buildup across the filter defines the lifetime at a defined level for that application or design. Since this buildup of pressure is a result of load, for systems of equal efficiency a longer life is typically directly associated with higher capacity. Efficiency is the propensity of the media to trap, rather than pass, particulates. It should be apparent that typically the more efficient a filter media is at removing particulates from a gas flow stream, in general the more rapidly the filter media will approach the "lifetime" pressure differential (assuming other variables to be held constant). In this application the term "unchanged for filtration purposes" refers to maintaining sufficient efficiency to remove particulate from the fluid stream as is necessary for the selected application.

Paper filter elements are widely used forms of surface loading media. In general, paper elements comprise dense mats of cellulose, synthetic or other fibers oriented across a gas stream carrying particulate material. The paper is generally constructed to be permeable to the gas flow, and to also have a sufficiently fine pore size and appropriate porosity to inhibit the passage of particles greater than a selected size therethrough. As the gases (fluids) pass through the filter paper, the upstream side of the filter paper operates through diffusion and interception to capture and retain selected sized particles from the gas (fluid) stream. The particles are collected as a dust cake on the upstream side of the filter paper. In time, the dust cake also begins to operate as a filter, increasing efficiency. This is sometimes referred to as "seasoning," i.e. development of an efficiency greater than initial efficiency.

A simple filter design such as that described above is subject to at least two types of problems. First, a relatively simple flaw, i.e. rupture of the paper, results in failure of the system. Secondly, particulate material rapidly builds up on the upstream side of the filter, as a thin dust cake or layer, increasing the pressure drop. Various methods have been applied to increase the "lifetime" of surface-loaded filter systems, such as paper filters. One method is to provide the media in a pleated construction, so that the surface area of media encountered by the gas flow stream is increased relative to a flat, non-pleated construction. While this increases filter lifetime, it is still substantially limited. For this reason, surface loaded media has primarily found use in applications wherein relatively low velocities through the filter media are involved, generally not higher than about 20-30 feet per minute and typically on the order of about 10 feet per minute or less. The term "velocity" in this context is the average velocity through the media (i.e. flow volume per media area).

In general, as air flow velocity is increased through a pleated paper media, filter life is decreased by a factor proportional to the square of the velocity. Thus, when a pleated paper, surface loaded, filter system is used as a particulate filter for a system that requires substantial flows of air, a relatively large surface area for the filter media is needed. For example, a typical cylindrical pleated paper filter element of an over-the-highway diesel truck will be about 9-15 inches in diameter and about 12-24 inches long, with pleats about 1-2 inches deep. Thus, the filtering surface area of media (one side) is typically 30 to 300 square feet.

In many applications, especially those involving relatively high flow rates, an alternative type of filter media, sometimes generally referred to as "depth" media, is used. A typical depth media comprises a relatively thick tangle of fibrous material. Depth media is generally defined in terms of its porosity, density or percent solids content. For example, a 2-3% solidity media would be a depth media mat of fibers arranged such that approximately 2-3% of the overall volume comprises fibrous materials (solids), the remainder being air or gas space.

Another useful parameter for defining depth media is fiber diameter. If percent solidity is held constant, but fiber diameter (size) is reduced, pore size or interfiber space is reduced, i.e. the filter becomes more efficient and will more effectively trap smaller particles.

A typical conventional depth media filter is a deep, relatively constant (or uniform) density, media, i.e. a system in which the solidity of the depth media remains substantially constant throughout its thickness. By "substantially constant" in this context, it is meant that only relatively minor fluctuations in density, if any, are found throughout the depth of the media. Such fluctuations, for example, may result from a slight compression of an outer engaged surface, by a container in which the filter media is positioned.

Gradient density depth media arrangements have been developed. Some such arrangements are described, for example, in U.S. Pat. Nos. 4,082,476; 5,238,474; and 5,364, 456. In general, a depth media arrangement can be designed to provide "loading" of particulate materials substantially throughout its volume or depth. Thus, such arrangements can be designed to load with a higher amount of particulate material, relative to surface loaded systems, when full filter lifetime is reached. However, in general the tradeoff for such arrangements has been efficiency, since, for substantial loading, a relatively low solidity media is desired. Gradient density systems such as those in the patents referred to above, have been designed to provide for substantial efficiency and longer life. In some instances, surface loading media is utilized as a "polish" filter in such arrangements.

Polymeric materials have been fabricated in non-woven and woven fabrics, fibers and microfibers. The polymeric material provides the physical properties required for product stability. These materials should not change significantly in dimension, suffer reduced molecular weight, become less flexible or subject to stress cracking or physically deteriorate in the presence of sunlight, humidity, high temperatures or other negative environmental effects. The invention relates to an improved polymeric material that can maintain physical properties in the face of incident electromagnetic radiation such as environmental light, heat, humidity and other physical challenges.

Polymer materials that can be used in the polymeric compositions of the invention include both addition polymer and condensation polymer materials such as polyolefin, polyacetal, polyamide, polyester, cellulose ether and ester, polyalkylene sulfide, polyarylene oxide, polysulfone, modified polysulfone polymers and mixtures thereof. Preferred materials that fall within these generic classes include polyethylene, polypropylene, poly(vinylchloride), polymethylmethacrylate (and other acrylic resins), polystyrene, and copolymers thereof (including ABA type block copolymers), poly(vinylidene fluoride), poly(vinylidene chloride), polyvinylalcohol in various degrees of hydrolysis (87% to 99.5%) in crosslinked and non-crosslinked forms. Preferred addition polymers tend to be glassy (a Tg greater than room temperature). This is the case for polyvinylchloride and polymethylmethacrylate, polystyrene polymer compositions or alloys or low in crystallinity for polyvinylidene fluoride and polyvinylalcohol materials. One class of polyamide condensation polymers are nylon materials. The term "nylon" is a generic name for all long chain synthetic polyamides. Typically, nylon nomenclature includes a series of numbers such as in nylon-6,6 which indicates that the starting materials are a $C_6$ diamine and a $C_6$ diacid (the first digit indicating a $C_6$ diamine and the second digit indicating a $C_6$ dicarboxylic acid compound). Another nylon can be made by the polycondensation of epsilon caprolactam in the presence of a small amount of water. This reaction forms a nylon-6 (made from a cyclic lactam—also known as epsilon-aminocaproic acid) that is a linear polyamide. Further, nylon copolymers are also contemplated. Copolymers can be made by combining various diamine compounds, various diacid compounds and various cyclic lactam structures in a reaction mixture and then forming the nylon with randomly positioned monomeric materials in a polyamide structure. For example, a nylon 6,6-6,10 material is a nylon manufactured from hexamethylene diamine and a $C_6$ and a $C_{10}$ blend of diacids. A nylon 6-6,6-6,10 is a nylon manufactured by copolymerization of epsilonaminocaproic acid, hexamethylene diamine and a blend of a $C_6$ and a $C_{10}$ diacid material.

Block copolymers are also useful in the process of this invention. With such copolymers the choice of solvent swelling agent is important. The selected solvent is such that both blocks were soluble in the solvent. One example is an ABA (styrene-EP-styrene) or AB (styrene-EP) polymer in methylene chloride solvent. If one component is not soluble in the solvent, it will form a gel. Examples of such block copolymers are Kraton® type of styrene-b-butadiene and styrene-b-hydrogenated butadiene (ethylene propylene), Pebax® type of ε-caprolactam-b-ethylene oxide, Sympatex® polyester-b-ethylene oxide and polyurethanes of ethylene oxide and isocyanates.

Addition polymers like polyvinylidene fluoride, syndiotactic polystyrene, copolymer of vinylidene fluoride and hexafluoropropylene, polyvinyl alcohol, polyvinyl acetate, amorphous addition polymers, such as poly(acrylonitrile) and its copolymers with acrylic acid and methacrylates, polystyrene, poly(vinyl chloride) and its various copolymers, poly (methyl methacrylate) and its various copolymers, can be solution spun with relative ease because they are soluble at low pressures and temperatures. However, highly crystalline polymer like polyethylene and polypropylene require high temperature, high pressure solvent if they are to be solution spun. Therefore, solution spinning of the polyethylene and polypropylene is very difficult. Electrostatic solution spinning is one method of making nanofibers and microfiber.

We have also found a substantial advantage to forming polymeric compositions comprising two or more polymeric materials in polymer admixture, alloy format or in a crosslinked chemically bonded structure. We believe such polymer compositions improve physical properties by changing polymer attributes such as improving polymer chain flexibility or chain mobility, increasing overall molecular weight and providing reinforcement through the formation of networks of polymeric materials.

In one embodiment of this concept, two related polymer materials can be blended for beneficial properties. For example, a high molecular weight polyvinylchloride can be blended with a low molecular weight polyvinylchloride. Similarly, a high molecular weight nylon material can be blended with a low molecular weight nylon material. Further, differing species of a general polymeric genus can be blended. For example, a high molecular weight styrene material can be blended with a low molecular weight, high impact polystyrene. A Nylon-6 material can be blended with a nylon copolymer such as a Nylon-6; 6,6; 6,10 copolymer. Further, a polyvinylalcohol having a low degree of hydrolysis such as a 87% hydrolyzed polyvinylalcohol can be blended with a fully or superhydrolyzed polyvinylalcohol having a degree of hydrolysis between 98 and 99.9% and higher. All of these materials in admixture can be crosslinked using appropriate crosslinking mechanisms. Nylons can be crosslinked using crosslinking agents that are reactive with the nitrogen atom in the amide linkage. Polyvinylalcohol materials can be crosslinked using hydroxyl reactive materials such as monoaldehydes, such as formaldehyde, ureas, melamine-formaldehyde resin and its analogues, boric acids and other inorganic compounds. dialdehydes, diacids, urethanes, epoxies and other known crosslinking agents. Crosslinking technology is a well known and understood phenomenon in which a crosslinking reagent reacts and forms covalent bonds between polymer chains to substantially improve molecular weight, chemical resistance, overall strength and resistance to mechanical degradation.

We have found that additive materials can significantly improve the properties of the polymer materials in the form of a fine fiber. The resistance to the effects of heat, humidity, impact, mechanical stress and other negative environmental effect can be substantially improved by the presence of additive materials. We have found that while processing the microfiber materials of the invention, that the additive materials can improve the oleophobic character, the hydrophobic character and can appear to aid in improving the chemical stability of the materials. We believe that the fine fibers of the invention in the form of a microfiber are improved by the presence of these oleophobic and hydrophobic additives as these additives form a protective layer coating, ablative surface or penetrate the surface to some depth to improve the nature of the polymeric material. We believe the important characteristics of these materials are the presence of a strongly hydrophobic group that can preferably also have oleophobic character. Strongly hydrophobic groups include fluorocarbon groups, hydrophobic hydrocarbon surfactants or blocks and substantially hydrocarbon oligomeric compositions. These materials are manufactured in compositions that have a portion of the molecule that tends to be compatible with the polymer material affording typically a physical bond or association with the polymer while the strongly hydrophobic or oleophobic group, as a result of the association of the additive with the polymer, forms a protective surface layer that resides on the surface or becomes alloyed with or mixed with the polymer surface layers. For 0.2-micron fiber with 10% additive level, the surface thickness is calculated to be around 50 Å, if the additive has migrated toward the surface. Migration is believed to occur due to the incompatible nature of the oleophobic or hydrophobic groups in the bulk material. A 50 Å thickness appears to be reasonable thickness for protective coating. For 0.05-micron diameter fiber, 50 Å thickness corresponds to 20% mass. For 2 microns thickness fiber, 50 Å thickness corresponds to 2% mass. Preferably the additive materials are used at an amount of about 2 to 25 wt. %. Oligomeric additives that can be used in combination with the polymer materials of the invention include oligomers having a molecular weight of about 500 to about 5000, preferably about 500 to about 3000 including fluoro-chemicals, nonionic surfactants and low molecular weight resins or oligomers. Fluoro-organic wetting agents useful in this invention are organic molecules represented by the formula $$R_f\text{-}G$$

wherein $R_f$ is a fluoroaliphatic radical and G is a group which contains at least one hydrophilic group such as cationic, anionic, nonionic, or amphoteric groups. Nonionic materials are preferred. $R_f$ is a fluorinated, monovalent, aliphatic organic radical containing at least two carbon atoms. Preferably, it is a saturated perfluoroaliphatic monovalent organic radical. However, hydrogen or chlorine atoms can be present as substituents on the skeletal chain. While radicals containing a large number of carbon atoms may function adequately, compounds containing not more than about 20 carbon atoms are preferred since large radicals usually represent a less efficient utilization of fluorine than is possible with shorter skeletal chains. Preferably, $R_f$ contains about 2 to 8 carbon atoms.

The cationic groups that are usable in the fluoro-organic agents employed in this invention may include an amine or a quaternary ammonium cationic group which can be oxygen-free (e.g., —$NH_2$) or oxygen-containing (e.g., amine oxides). Such amine and quaternary ammonium cationic hydrophilic groups can have formulas such as —$NH_2$, —$(NH_3)X$, —$(NH(R^2)_2)X$, —$(NH(R^2)_3)X$, or —$N(R_2)_2{\rightarrow}O$, where x is an anionic counterion such as halide, hydroxide, sulfate, bisulfate, or carboxylate, $R^2$ is H or $C_{1-18}$ alkyl group, and each $R^2$ can be the same as or different from other $R^2$ groups. Preferably, $R^2$ is H or a $C_{1-16}$ alkyl group and X is halide, hydroxide, or bisulfate.

The anionic groups which are usable in the fluoro-organic wetting agents employed in this invention include groups which by ionization can become radicals of anions. The anionic groups may have formulas such as —COOM, —$SO_3M$, —$OSO_3M$, —$PO_3HM$, —$OPO_3M_2$, or —$OPO_3HM$, where M is H, a metal ion, $(NR^1_4)^+$, or $(SR^1_4)^+$, where each $R^1$ is independently H or substituted or unsubstituted $C_1$-$C_6$ alkyl. Preferably M is $Na^+$ or $K^+$. The preferred anionic groups of the fluoro-organo wetting agents used in this invention have the formula —COOM or —$SO_3M$. Included within the group of anionic fluoro-organic wetting agents are anionic polymeric materials typically manufactured from ethylenically unsaturated carboxylic mono- and diacid monomers having pendent fluorocarbon groups appended thereto. Such materials include surfactants obtained from 3M Corporation known as FC-430 and FC-431.

The amphoteric groups which are usable in the fluoro-organic wetting agent employed in this invention include groups which contain at least one cationic group as defined above and at least one anionic group as defined above.

The nonionic groups which are usable in the fluoro-organic wetting agents employed in this invention include groups which are hydrophilic but which under pH conditions of normal agronomic use are not ionized. The nonionic groups may have formulas such as —$O(CH_2CH_2)xOH$ where x is greater than 1, —$SO_2NH_2$, —$SO_2NHCH_2CH_2OH$, —$SO_2N(CH_2CH_2H)_2$, —$CONH_2$, —$CONHCH_2CH_2OH$, or —$CON(CH_2CH_2OH)_2$. Examples of such materials include materials of the following structure:

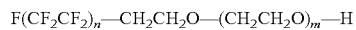

wherein n is 2 to 8 and m is 0 to 20.

Other fluoro-organic wetting agents include those cationic fluorochemicals described, for example in U.S. Pat. Nos. 2,764,602; 2,764,603; 3,147,064 and 4,069,158. Such amphoteric fluoro-organic wetting agents include those amphoteric fluorochemicals described, for example, in U.S. Pat. Nos. 2,764,602; 4,042,522; 4,069,158; 4,069,244; 4,090,967; 4,161,590 and 4,161,602. Such anionic fluoro-organic wetting agents include those anionic fluorochemicals described, for example, in U.S. Pat. Nos. 2,803,656; 3,255,131; 3,450,755 and 4,090,967.

Examples of such materials are duPont Zonyl FSN and duPont Zonyl FSO nonionic surfactants. Another aspect of additives that can be used in the polymers of the invention include low molecular weight fluorocarbon acrylate materials such as 3M's Scotchgard® material having the general structure:

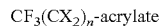

wherein X is —F or —$CF_3$ and n is 1 to 7.

Further, nonionic hydrocarbon surfactants including lower alcohol ethoxylates, fatty acid ethoxylates, nonylphenol ethoxylates, etc. can also be used as additive materials for the invention. Examples of these materials include Triton X-100 and Triton N-101.

A useful material for use as an additive material in the compositions of the invention are tertiary butylphenol oligomers. Such materials tend to be relatively low molecular weight aromatic phenolic resins. Such resins are phenolic polymers prepared by enzymatic oxidative coupling. The absence of methylene bridges result in unique chemical and physical stability. These phenolic resins can be crosslinked with various amines and epoxies and are compatible with a variety of polymer materials. These materials are generally exemplified by the following structural formulas which are characterized by phenolic materials in a repeating motif in the absence of methylene bridge groups having phenolic and aromatic groups.

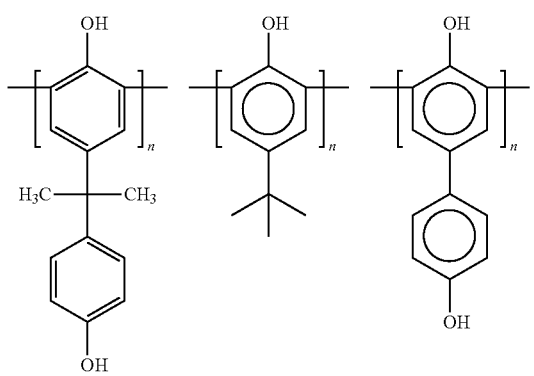

wherein n is 2 to 20. Examples of these phenolic materials include Enzo-BPA, Enzo-BPA/phenol, Enzo-TBP, Enzo-COP and other related phenolics were obtained from Enzymol International Inc., Columbus, Ohio.

It should be understood that an extremely wide variety of fibrous filter media exist for different applications. The durable nanofibers and microfibers described in this invention can be added to any of the media. The fibers described in this invention can also be used to substitute for fiber components of these existing media giving the significant advantage of improved performance (improved efficiency and/or reduced pressure drop) due to their small diameter, while exhibiting greater durability.

Polymer nanofibers and microfibers are known, however their use has been very limited due to their fragility to mechanical stresses, and their susceptibility to chemical degradation due to their very high surface area to volume ratio. The fibers described in this invention address these limitations and will therefore be usable in a very wide variety of filtration, textile, membrane and other diverse applications.

A filter media construction according to the present invention includes a first layer of permeable coarse fibrous media or substrate having a first surface. A first layer of fine fiber media is secured to the first surface of the first layer of permeable coarse fibrous media. Preferably the first layer of permeable coarse fibrous material comprises fibers having an average diameter of at least 10 microns, typically and preferably about 12 (or 14) to 30 microns. Also preferably the first layer of permeable coarse fibrous material comprises a media having a basis weight of no greater than about 200 grams/meter$^2$, preferably about 0.50 to 150 g/m$^2$, and most preferably at least 8 g/m$^2$. Preferably the first layer of permeable coarse fibrous media is at least 0.0005 inch (12 microns) thick, and typically and preferably is about 0.001 to 0.030 inch (25-800 microns) thick.

In preferred arrangements, the first layer of permeable coarse fibrous material comprises a material which, if evaluated separately from a remainder of the construction by the Frazier permeability test, would exhibit a permeability of at least 1 meter(s)/min, and typically and preferably about 2-900 meters/min. Herein when reference is made to efficiency, unless otherwise specified, reference is meant to efficiency when measured according to ASTM-1215-89, with 0.78µ monodisperse polystyrene spherical particles, at 20 fpm (6.1 meters/min) as described herein.

Preferably the layer of fine fiber material secured to the first surface of the layer of permeable coarse fibrous media is a layer of nano- and microfiber media wherein the fibers have average fiber diameters of no greater than about 2 microns, generally and preferably no greater than about 1 micron, and typically and preferably have fiber diameters smaller than 0.5 micron and within the range of about 0.05 to 0.5 micron. Also, preferably the first layer of fine fiber material secured to the first surface of the first layer of permeable coarse fibrous material has an overall thickness that is no greater than about 30 microns, more preferably no more than 20 microns, most preferably no greater than about 10 microns, and typically and preferably that is within a thickness of about 1-8 times (and more preferably no more than 5 times) the fine fiber average diameter of the layer.

Certain preferred arrangements according to the present invention include filter media as generally defined, in an overall filter construction. Some preferred arrangements for such use comprise the media arranged in a cylindrical, pleated configuration with the pleats extending generally longitudinally, i.e. in the same direction as a longitudinal axis of the cylindrical pattern. For such arrangements, the media may be imbedded in end caps, as with conventional filters. Such arrangements may include upstream liners and downstream liners if desired, for typical conventional purposes.

In some applications, media according to the present invention may be used in conjunction with other types of media, for example conventional media, to improve overall filtering performance or lifetime. For example, media according to the present invention may be laminated to conventional media, be utilized in stack arrangements; or be incorporated (an integral feature) into media structures including one or more regions of conventional media. It may be used upstream of such media, for good load; and/or, it may be used downstream from conventional media, as a high efficiency polishing filter.

Certain arrangements according to the present invention may also be utilized in liquid filter systems, i.e. wherein the particulate material to be filtered is carried in a liquid. Also, certain arrangements according to the present invention may be used in mist collectors, for example arrangements for filtering fine mists from air.

According to the present invention, methods are provided for filtering. The methods generally involve utilization of media as described to advantage, for filtering. As will be seen from the descriptions and examples below, media according to the present invention can be specifically configured and constructed to provide relatively long life in relatively efficient systems, to advantage.

Various filter designs are shown in patents disclosing and claiming various aspects of filter structure and structures used with the filter materials. Engel et al., U.S. Pat. No. 4,720,292, disclose a radial seal design for a filter assembly having a generally cylindrical filter element design, the filter element being sealed by a relatively soft, rubber-like end cap having a cylindrical, radially inwardly facing surface. Kahlbaugh et al., U.S. Pat. No. 5,082,476, disclose a filter design using a depth media comprising a foam substrate with pleated components combined with the microfiber materials of the invention. Stifelman et al., U.S. Pat. No. 5,104,537, relate to a filter structure useful for filtering liquid media. Liquid is entrained into the filter housing, passes through the exterior of the filter into an interior annular core and then returns to active use in the structure. Such filters are highly useful for filtering hydraulic fluids. Engel et al., U.S. Pat. No. 5,613,992, show a typical diesel engine air intake filter structure. The structure obtains air from the external aspect of the housing that may or may not contain entrained moisture. The air passes through the filter while the moisture can pass to the bottom of the housing and can drain from the housing. Gillingham et al., U.S. Pat. No. 5,820,646, disclose a Z filter structure that uses a specific pleated filter design involving plugged passages that require a fluid stream to pass through at least one layer of filter media in a "Z" shaped path to obtain proper filtering performance. The filter media formed into the pleated Z shaped format can contain the fine fiber media of the invention. Glen et al., U.S. Pat. No. 5,853,442, disclose a bag house structure having filter elements that can contain the fine fiber structures of the invention. Berkhoel et al., U.S. Pat. No. 5,954,849, show a dust collector structure useful in processing typically air having large dust loads to filter dust from an air stream after processing a workpiece generates a significant dust load in an environmental air. Lastly, Gillingham, U.S. Design Pat. No. 425,189, discloses a panel filter using the Z filter design.

DETAILED DESCRIPTION OF CERTAIN DRAWINGS

The microfiber or nanofiber of the unit can be formed by the electrostatic spinning process. A suitable apparatus for forming the fiber is illustrated in FIG. 1. This apparatus includes a reservoir 80 in which the fine fiber forming polymer solution is contained, a pump 81 and a rotary type emitting device or emitter 40 to which the polymeric solution is pumped. The emitter 40 generally consists of a rotating union 41, a rotating portion 42 including a plurality of offset holes 44 and a shaft 43 connecting the forward facing portion and the rotating union. The rotating union 41 provides for introduction of the polymer solution to the forward facing portion 42 through the hollow shaft 43. The holes 44 are spaced around the periphery of the forward facing portion 42. Alternatively, the rotating portion 42 can be immersed into a reservoir of polymer fed by reservoir 80 and pump 81. The rotating portion 42 then obtains polymer solution from the reservoir and as it rotates in the electrostatic field, a droplet of the solution is accelerated by the electrostatic field toward the collecting media 70 as discussed below.

Facing the emitter 40, but spaced apart therefrom, is a substantially planar grid 60 upon which the collecting media 70, i.e. substrate or combined substrate is positioned. Air can be drawn through the grid. The collecting media 70 is passed around rollers 71 and 72 which are positioned adjacent opposite ends of grid 60. A high voltage electrostatic potential is maintained between emitter 40 and grid 60 by means of a suitable electrostatic voltage source 61 and connections 62 and 63 which connect respectively to the grid 60 and emitter 40.

In use, the polymer solution is pumped to the rotating union 41 or reservoir from reservoir 80. The forward facing portion 42 rotates while liquid exits from holes 44, or is picked up from a reservoir, and moves from the outer edge of the emitter toward collecting media 70 positioned on grid 60. Specifically, the electrostatic potential between grid 60 and the emitter 40 imparts a charge to the material which cause liquid to be emitted therefrom as thin fibers which are drawn toward grid 60 where they arrive and are collected on substrate 12 or an efficiency layer 14. In the case of the polymer in solution, solvent is evaporated off the fibers during their flight to the grid 60; therefore, the fibers arrive at the substrate 12 or efficiency layer 14. The fine fibers bond to the substrate fibers first encountered at the grid 60. Electrostatic field strength is selected to ensure that the polymer material as it is accelerated from the emitter to the collecting media 70, the acceleration is sufficient to render the material into a very thin microfiber or nanofiber structure. Increasing or slowing the advance rate of the collecting media can deposit more or less emitted fibers on the forming media, thereby allowing control of the thickness of each layer deposited thereon. The rotating portion 42 can have a variety of beneficial positions. The rotating portion 42 can be placed in a plane of rotation such that the plane is perpendicular to the surface of the collecting media 70 or positioned at any arbitrary angle. The rotating media can be positioned parallel to or slightly offset from parallel orientation.

Figure 2:
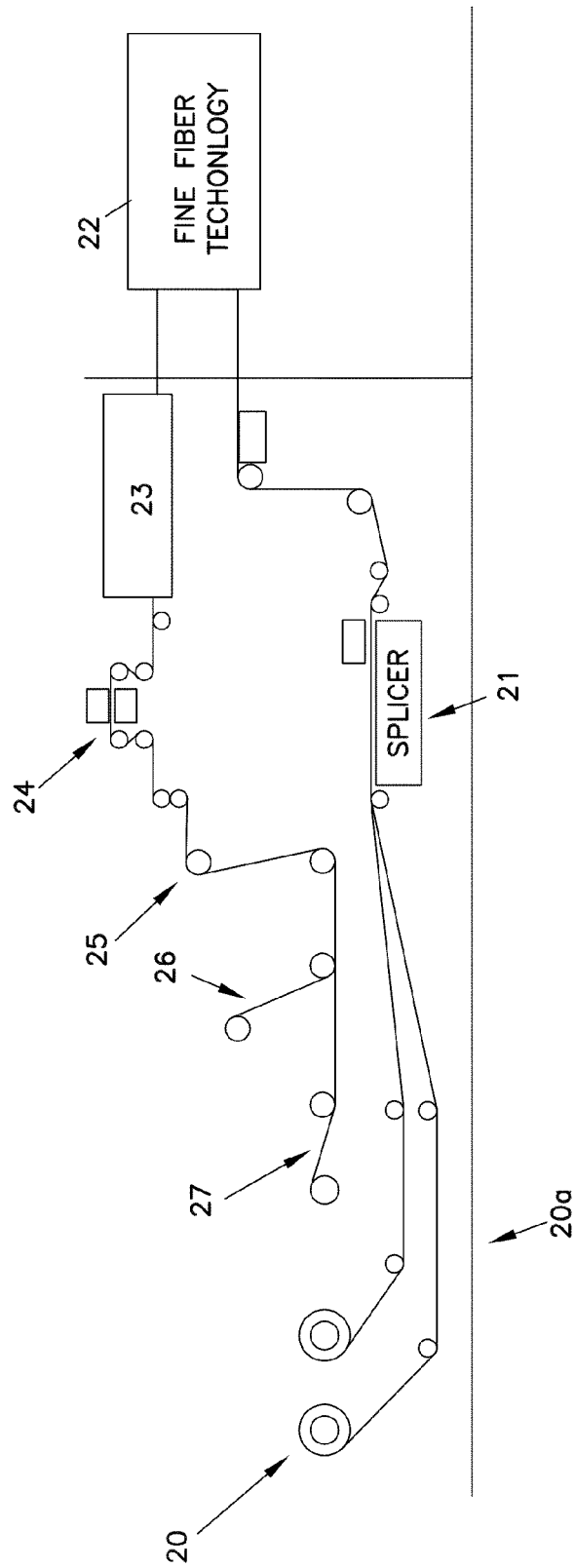
FIG. 2 shows the apparatus used to introduce fine fiber onto filter substrate into the fine fiber forming technology shown in FIG. 1.

FIG. 2 is a general schematic diagram of a process and apparatus for forming a layer of fine fiber on a sheet-like substrate or media. In FIG. 2, the sheet-like substrate is unwound at station 20. The sheet-like substrate 20a is then directed to a splicing station 21 wherein multiple lengths of the substrate can be spliced for continuous operation. The continuous length of sheet-like substrate is directed to a fine fiber technology station 22 comprising the spinning technology of FIG. 1 wherein a spinning device forms the fine fiber and lays the fine fiber in a filtering layer on the sheet-like substrate. After the fine fiber layer is formed on the sheet-like substrate in the formation zone 22, the fine fiber layer and substrate are directed to a heat treatment station 23 for appropriate processing. The sheet-like substrate and fine fiber layer is then tested in an efficiency monitor 24 and nipped if necessary at a nip station 25. The sheet-like substrate and fiber layer is then steered to the appropriate winding station to be wound onto the appropriate spindle for further processing 26 and 27.

FIG. 3 is a scanning electron micrograph image showing the relationship of typical dust particles having a diameter of about 2 and about 5 microns with respect to the sizes of pores in typical cellulose media and in the typical fine fiber structures. In FIG. 3a, the 2 micron particle 31 and the 5 micron particle 32 is shown in a cellulosic media 33 with pore sizes that are shown to be quite a bit larger than the typical particle diameters. In sharp contrast, in FIG. 3B, the 2 micron particle 31 appears to be approximately equal to or greater than the typical openings between the fibers in the fiber web 35 while the 5 micron particle 32 appears to be larger than any of the openings in the fine fiber web 35.

The foregoing general description of the various aspects of the polymeric materials of the invention, the fine fiber materials of the invention including both microfibers and nanofibers and the construction of useful filter structures from the fine fiber materials of the invention provides an understanding of the general technological principles of the operation of the invention. The following specific exemplary materials are examples of materials that can be used in the formation of the fine fiber materials of the invention and the following materials disclose a best mode. The following exemplary materials were manufactured with the following characteristics and process conditions in mind. Electrospinning small diameter fiber less than 10 micron is obtained using an electrostatic force from a strong electric field acting as a pulling force to stretch a polymer jet into a very fine filament. A polymer melt can be used in the electrospinning process, however, fibers smaller than 1 micron are best made from polymer solution. As the polymer mass is drawn down to smaller diameter, solvent evaporates and contributes to the reduction of fiber size. Choice of solvent is critical for several reasons. If solvent dries too quickly, then fibers tend to be flat and large in diameter. If the solvent dries too slowly, solvent will redissolve the formed fibers. Therefore matching drying rate and fiber formation is critical. At high production rates, large quantities of exhaust air flow helps to prevent a flammable atmosphere, and to reduce the risk of fire. A solvent that is not combustible is helpful. In a production environment the processing equipment will require occasional cleaning Safe low toxicity solvents minimize worker exposure to hazardous chemicals. Electrostatic spinning can be done at a flow rate of 1.5 ml/min per emitter, a target distance of 8 inches, an emitter voltage of 88 kV, an emitter rpm of 200 and a relative humidity of 45%.

The choice of polymer system is important for a given application. For pulse cleaning application, an extremely thin layer of microfiber can help to minimize pressure loss and provide an outer surface for particle capture and release. A thin layer of fibers of less than 2-micron diameter, preferably less than 0.3-micron diameter is preferred. Good adhesion between microfiber or nanofiber and substrates upon which the microfibers or nanofibers are deposited is important. When filters are made of composites of substrate and thin layer of micro- and nanofibers, such composite makes an excellent filter medium for self-cleaning application. Cleaning the surface by back pulsing repeatedly rejuvenates the filter medium. As a great force is exerted on the surface, fine fiber with poor adhesion to substrates can delaminate upon a back pulse that passes from the interior of a filter through a substrate to the micro fiber. Therefore, good cohesion between micro fibers and adhesion between substrate fibers and electrospun fibers is critical for successful use.

Products that meet the above requirements can be obtained using fibers made from different polymer materials. Small fibers with good adhesion properties can be made from such polymers like polyvinylidene chloride, poly vinyl alcohol and polymers and copolymers comprising various nylons such as nylon 6, nylon 4,6; nylon 6,6; nylon 6,10 and copolymers thereof. Excellent fibers can be made from PVDF, but to make sufficiently small fiber diameters requires chlorinated solvents. Nylon 6, Nylon 66 and Nylon 6,10 can be electrospun. But, solvents such as formic acid, m-cresol, tri-fluoro ethanol, hexafluoro isopropanol are either difficult to handle or very expensive. Preferred solvents include water, ethanol, isopropanol, acetone and N-methyl pyrrolidone due to their low toxicity. Polymers compatible with such solvent systems have been extensively evaluated. We have found that fibers made from PVC, PVDC, polystyrene, polyacrylonitrile, PMMA, PVDF require additional adhesion means to attain structural properties. We also found that when polymers are dissolved in water, ethanol, isopropanol, acetone, methanol and mixtures thereof and successfully made into fibers, they have excellent adhesion to the substrate, thereby making an excellent filter medium for self-cleaning application. Self-cleaning via back air pulse or twist is useful when filer medium is used for very high dust concentration. Fibers from alcohol soluble polyamides and poly(vinyl alcohol)s have been used successfully in such applications. Examples of alcohol soluble polyamides include Macromelt 6238, 6239, and 6900 from Henkel, Elvamide 8061 and 8063 from duPont and SVP 637 and 651 from Shakespeare Monofilament Company. Another group of alcohol soluble polyamide is type 8 nylon, alkoxy alkyl modifies nylon 66 (Ref. Page 447, Nylon Plastics Handbook, Melvin Kohan ed. Hanser Publisher, New York, 1995). Examples of poly (vinyl alcohol) include PVA-217, 224 from Kuraray, Japan and Vinol 540 from Air Products and Chemical Company.

We have found that filters can be exposed to extremes in environmental conditions. Filters in Saudi Arabian desert can be exposed to temperature as high as 150° F. or higher. Filters installed in Indonesia or Gulf Coast of US can be exposed high humidity above 90% RH and high temperature of 100° F. Or, they can be exposed to rain. We have found that filters used under the hood of mobile equipment like cars, trucks, buses, tractors, and construction equipment can be exposed to high temperature (+200° F.), high relative humidity and other chemical environment. We have developed test methods to evaluate survivability of microfiber systems under harsh conditions. Soaking the filter media samples in hot water (140° F. for 5 minutes or exposure to high humidity, high temperature and air flow.

EXPERIMENTAL

The following materials were produced using the following electrospin process conditions.

The following materials were spun using either a rotating emitter system or a capillary needle system. Both were found to produce substantially the same fibrous materials.

The flow rate was 1.5 mil/min per emitter, a target distance of 8 inches, an emitter voltage of 88 kV, a relative humidity of 45%, and for the rotating emitter an rpm of 35.

Example 1

Effect of Fiber Size

Figure 12:
FIG. 12 shows the stability of the 0.23 and 0.45 microfiber material of the invention from Example 5.

Fine fiber samples were prepared from a copolymer of nylon 6, 66, 610 nylon copolymer resin (SVP-651) was analyzed for molecular weight by the end group titration. (J. E. Walz and G. B. Taylor, determination of the molecular weight of nylon, Anal. Chem. Vol. 19, Number 7, pp 448-450 (1947). Number average molecular weight was between 21,500 and 24,800. The composition was estimated by the phase diagram of melt temperature of three component nylon, nylon 6 about 45%, nylon 66 about 20% and nylon 610 about 25%. (Page 286, Nylon Plastics Handbook, Melvin Kohan ed. Hanser Publisher, New York (1995)). Reported physical properties of SVP 651 resin are:

| Property | ASTM Method | Units | Typical Value |
|---|---|---|---|
| Specific Gravity | D-792 | — | 1.08 |
| Water Absorption (24 hr immersion) | D-570 | % | 2.5 |
| Hardness | D-240 | Shore D | 65 |
| Melting Point | DSC | ° C.(° F.) | 154 (309) |
| Tensile Strength @ Yield | D-638 | MPa (kpsi) | 50 (7.3) |
| Elongation at Break | D-638 | % | 350 |
| Flexural Modulus | D-790 | MPa (kpsi) | 180 (26) |
| Volume Resistivity | D-257 | ohm-cm | $10^{12}$ | to produce fiber of 0.23 and 0.45 micron in diameter. Samples were soaked in room temperature water, air-dried and its efficiency was measured. Bigger fiber takes longer time to degrade and the level of degradation was less as can be seen in the plot of FIG. 12. While wishing not to be limited by certain theory, it appears that smaller fibers with a higher surface/volume ratio are more susceptible to degradation due to environmental effects. However, bigger fibers do not make as efficient filter medium.

Example 2

Cross-Linking of Nylon Fibers with Phenolic Resin and Epoxy Resin

In order to improve chemical resistance of fibers, chemical cross-linking of nylon fibers was attempted. Copolyamide (nylon 6, 66, 610) described earlier is mixed with phenolic resin, identified as Georgia Pacific 5137 and spun into fiber. Nylon:Phenolic Resin ratio and its melt temperature of blends are shown here;

| Composition | Melting Temperature (F. °) |
| --- | --- |
| Polyamide:Phenolic = 100:0 | 150 |
| Polyamide:Phenolic = 80:20 | 110 |
| Polyamide:Phenolic = 65:35 | 94 |
| Polyamide:Phenolic = 50:50 | 65 |

We were able to produce comparable fiber from the blends. The 50:50 blend could not be cross-linked via heat as the fibrous structure was destroyed. Heating 65:35 blend below 90° C. for 12 hours improves the chemical resistance of the resultant fibers to resist dissolution in alcohol. Blends of polyamide with epoxy resin, such Epon 828 from Shell and Epi-Rez 510 can be used.

Example 3

Surface Modification though Fluoro Additive (Scotchgard®) Repellant

Alcohol miscible Scotchgard® FC-430 and 431 from 3M Company were added to polyamide before spinning Add-on amount was 10% of solids. Addition of Scotchgard® did not hinder fiber formation. THC bench shows that Scotchgard®-like high molecular weight repellant finish did not improve water resistance. Scotchgard® added samples were heated at 300° F. for 10 minutes as suggested by manufacturer.

Example 4

Modification with Coupling Agents

Polymeric films were cast from polyamides with titanate coupling agents from Kenrich Petrochemicals, Inc. They include isopropyl triisostealoyl titanate (KR TTS), neopentyl (diallyl) oxytri (dioctyl) phosphato titanate (LICA12), neopentyl (dially) oxy, tri (N-ethylene diamino) ethyl zirconate (NZ44). Cast films were soaked in boiling water. Control sample without coupling agent loses its strength immediately, while coupling agent added samples maintained its form for up to ten minutes. These coupling agents added samples were spun into fiber (0.2 micron fiber).

Example 5

Modification with Low Molecular Weight p-tert-butyl Phenol Polymer

Oligomers of para-tert-butyl phenol, molecular weight range 400 to 1100, was purchased from Enzymol International, Columbus, Ohio. These low molecular weight polymers are soluble in low alcohols, such as ethanol, isopropanol and butanol. These polymers were added to co-polyamide described earlier and electrospun into 0.2 micron fibers without adverse consequences. Some polymers and additives hinder the electrospinning process. Unlike the conventional phenolic resin described in Example 2, we have found that this group of polymers does not interfere with fiber forming process.

We have found that this group of additive protects fine fibers from wet environment as see in the plot. FIGS. 13-16 show that oligomers provide a very good protection at 140° F., 100% humidity and the performance is not very good at 160° F. We have added this additive between 5% and 15% of polymer used. We have found that they are equally effective protecting fibers from exposure to high humidity at 140° F.

We have also found out that performance is enhanced when the fibers are subjected to 150° C. for short period of time.

Table 1 shows the effect of temperature and time exposure of 10% add-on to polyamide fibers.

TABLE 1

Efficiency Retained (%) After 140 deg. F. Soak:

| | Heating Time | | |
| --- | --- | --- | --- |
| Temperature | 1 min | 3 min | 10 min |
| 150 C. ° | 98.9 | 98.8 | 98.5 |
| | 98.8 | 98.9 | 98.8 |
| 130 C. ° | 95.4 | 98.7 | 99.8 |
| | 96.7 | 98.6 | 99.6 |
| 110 C. ° | 82.8 | 90.5 | 91.7 |
| | 86.2 | 90.9 | 85.7 |

This was a surprising result. We saw dramatic improvement in water resistance with this family of additives. In order to understand how this group of additive works, we have analyzed the fine fiber mat with surface analysis techniques called ESCA. 10% add-on samples shown in Table 1 were analyzed with ESCA at the University of Minnesota with the results shown in Table 2.

TABLE 2

Surface Composition (Polymer:Additive Ratio)

| | Heating Time | | |
| --- | --- | --- | --- |
| Temperature | 1 min | 3 min | 10 min |
| 150 C. °. | 40:60 | 40:60 | 50:50 |
| 130 C. °. | 60:40 | 56:44 | 62:82 |
| 110 C. °. | 63:37 | 64:36 | 59:41 |
| No Heat | 77:23 | | |

Initially, it did not seem to make sense to find surface concentration of additive more than twice of bulk concentration. However, we believe that this can be explained by the molecular weight of the additives. Molecular weight of the additive of about 600 is much smaller than that of host fiber forming polymer. As they are smaller in size, they can move along evaporating solvent molecules. Thus, we achieve higher surface concentration of additives. Further treatment increases the surface concentration of the protective additive. However, at 10 min exposure, 150° C., did not increase concentration. This may be an indication that mixing of two components of copolyamide and oligomer molecules is happening as long chain polymer has a time to move around. What this analysis has taught us is that proper selection of post treatment time and temperature can enhance performance, while too long exposure could have a negative influence.

We further examined the surface of these additive laden microfibers using techniques called Time of Flight SIMS. This technique involves bombarding the subject with electrons and observes what is coming from the surface. The samples without additives show organic nitrogen species are coming off upon bombardment with electron. This is an indication that polyamide species are broken off. It also shows presence of small quantity of impurities, such as sodium and silicone. Samples with additive without heat treatment (23% additive concentration on surface) show a dominant species of t-butyl fragment, and small but unambiguous peaks observed peaks observed for the polyamides. Also observed are high mass peaks with mass differences of 148 amu, corresponding to t-butyl phenol. For the sample treated at 10 min at 150° C. (50% surface additive concentration by ESCA analysis), inspection shows dominance of t-butyl fragments and trace, if at all, of peaks for polyamide. It does not show peaks associated with whole t-butyl phenol and its polymers. It also shows a peak associated with $C_2H_3O$ fragments.

The ToF SIMS analysis shows us that bare polyamide fibers will give off broken nitrogen fragment from exposed polymer chain and contaminants on the surface with ion bombardment. Additive without heat treatment shows incomplete coverage, indicating that additives do not cover portions of surface. The t-butyl oligomers are loosely organized on the surface. When ion beam hits the surface, whole molecules can come off along with labile t-butyl fragment. Additive with heat treatment promotes complete coverage on the surface. In addition, the molecules are tightly arranged so that only labile fragments such as t-butyl-, and possibly CH=CH—OH, are coming off and the whole molecules of t-butyl phenol are not coming off. ESCA and ToF SIMS look at different depths of surface. ESCA looks at deeper surface up to 100 Angstrom while ToF SIMS only looks at 10-Angstrom depth. These analyses agree.

Example 6

Development of Surface Coated Interpolymer

Type 8 Nylon was originally developed to prepare soluble and crosslinkable resin for coating and adhesive application. This type of polymer is made by the reaction of polyamide 66 with formaldehyde and alcohol in the presence of acid. (Ref. Cairns, T. L.; Foster, H. D.; Larcher, A. W.; Schneider, A. K.; Schreiber, R. S. J. Am. Chem. Soc. 1949, 71, 651). This type of polymer can be electrospun and can be crosslinked. However, formation of fiber from this polymer is inferior to copolyamides and crosslinking can be tricky.

In order to prepare type 8 nylon, 10-gallon high-pressure reactor was charged with the following ratio:

| | |
|---|---|
| Nylon 66 (duPont Zytel 101) | 10 pounds |
| Methanol | 15.1 pounds |
| Water | 2.0 pounds |
| Formaldehyde | 12.0 pounds |

The reactor is then flushed with nitrogen and is heated to at least 135° C. under pressure. When the desired temperature was reached, small quantity of acid was added as catalyst. Acidic catalysts include trifluoroacetic acid, formic acid, toluene sulfonic acid, maleic acid, maleic anhydride, phthalic acid, phthalic anhydride, phosphoric acid, citric acid and mixtures thereof. Nafion® polymer can also be used as a catalyst. After addition of catalyst, reaction proceeds up to 30 minutes. Viscous homogeneous polymer solution is formed at this stage. After the specified reaction time, the content of the high pressure vessel is transferred to a bath containing methanol, water and base, like ammonium hydroxide or sodium hydroxide to shortstop the reaction. After the solution is sufficiently quenched, the solution is precipitated in deionized water. Fluffy granules of polymer are formed. Polymer granules are then centrifuged and vacuum dried. This polymer is soluble in, methanol, ethanol, propanol, butanol and their mixtures with water of varying proportion. They are also soluble in blends of different alcohols.

Figure 13:
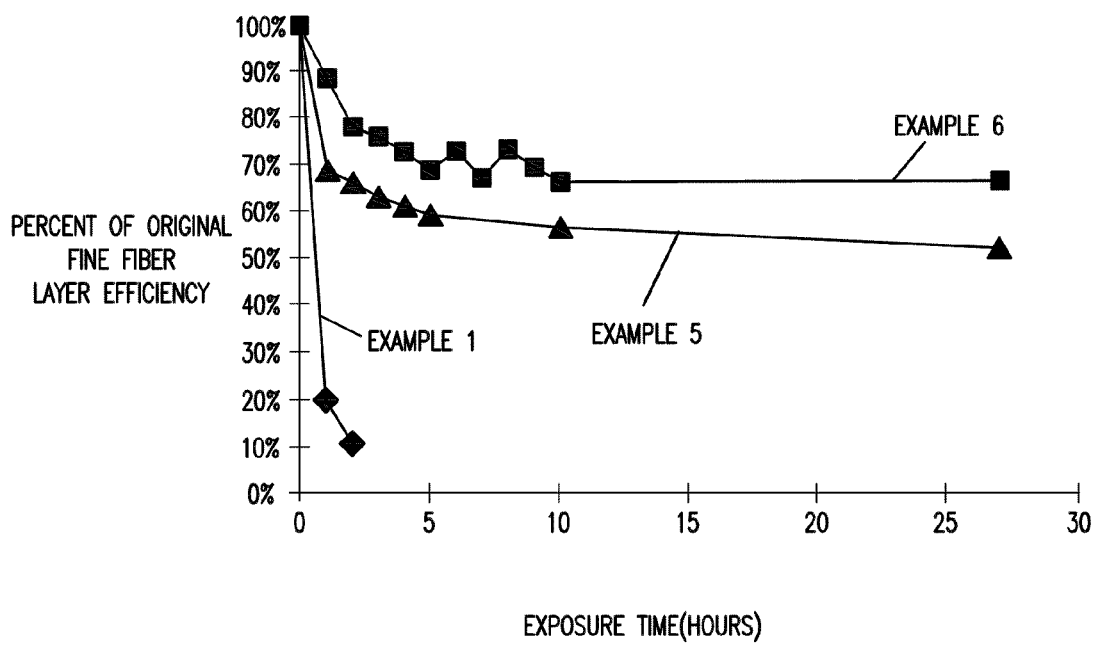
FIGS. 13 through 16 show the improved temperature and humidity stability of the materials of Examples 5 and 6 when compared to unmodified nylon copolymer solvent soluble polyamide.
Figure 14:
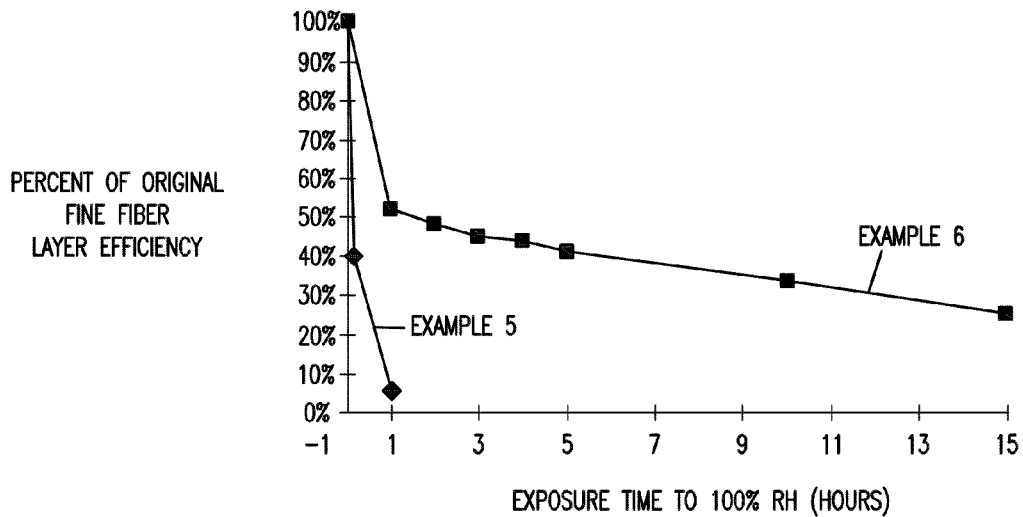
Figure 15:
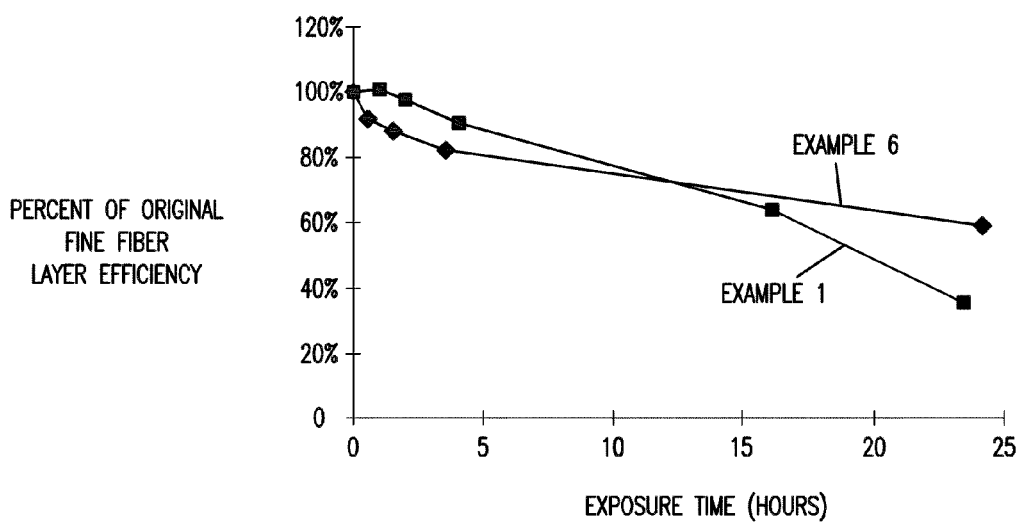
Figure 16:
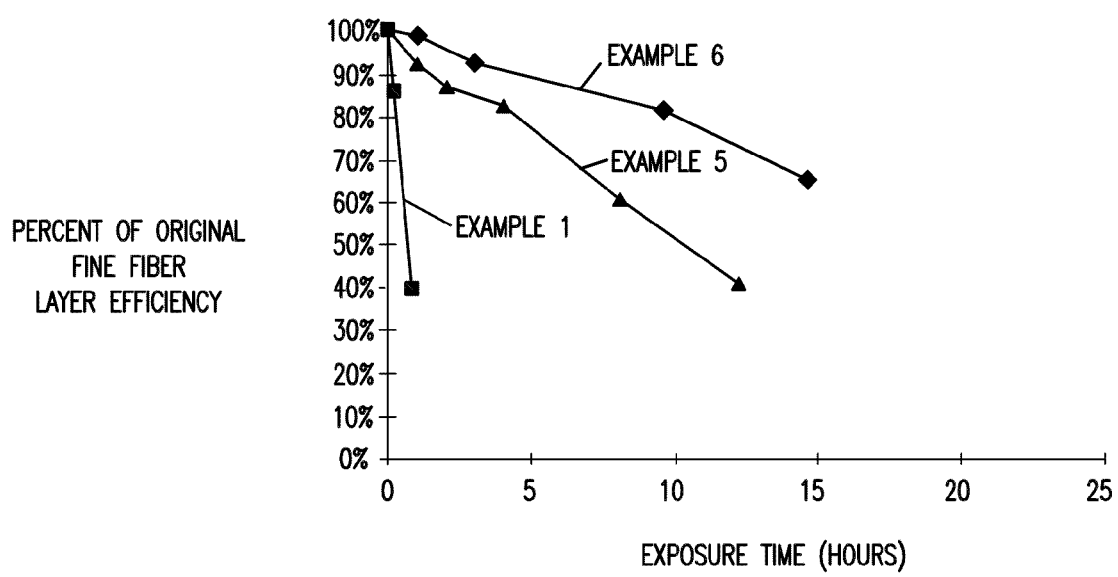
Figure 17:
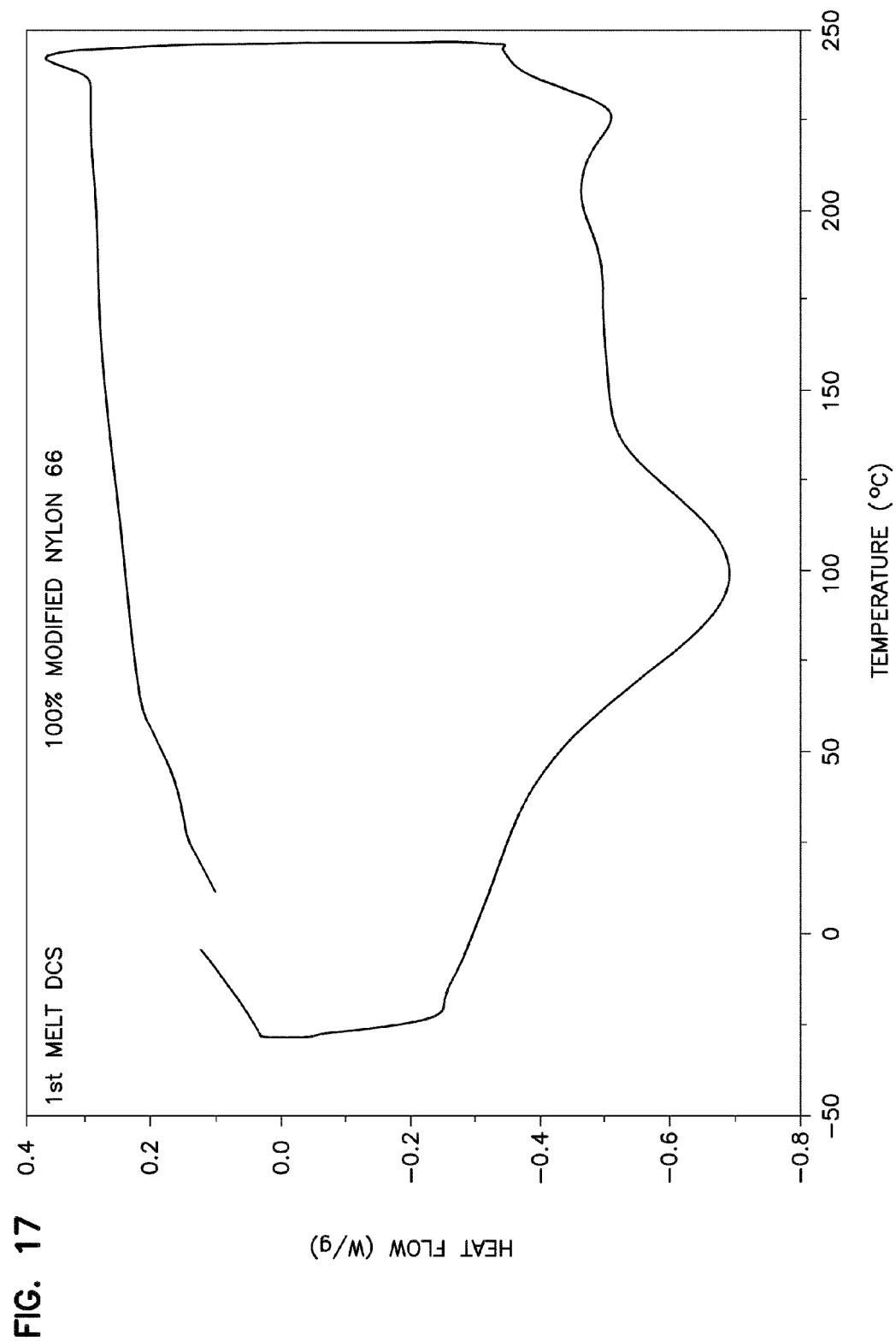
FIGS. 17 through 20 demonstrate that the blend of two copolymers, a nylon homopolymer and a nylon copolymer, once heat treated and combined with additives form a single component material that does not display distinguishable characteristics of two separate polymer materials, but appears to be a crosslinked or otherwise chemically joined single phase.
Figure 18:
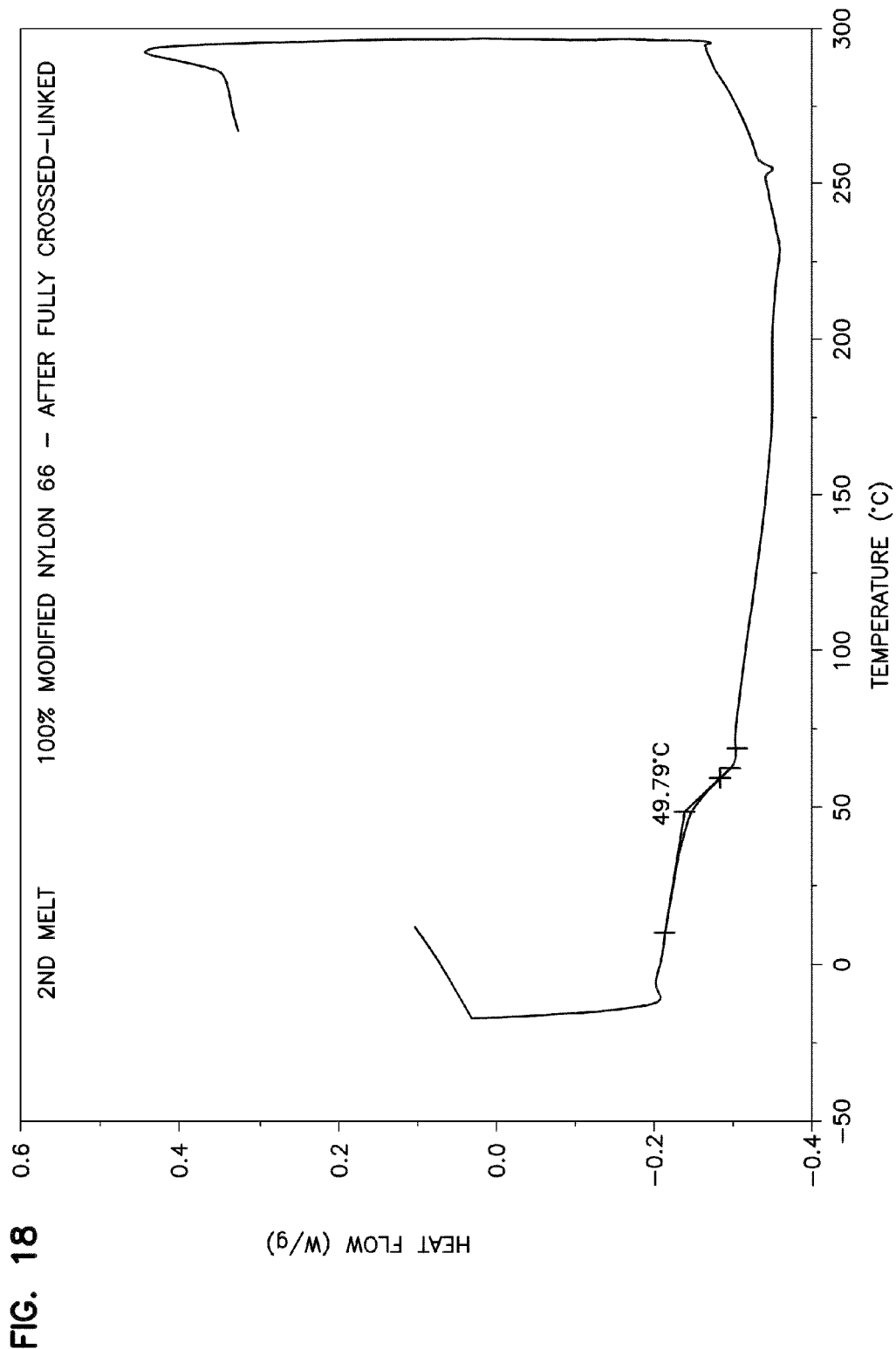
Figure 19:
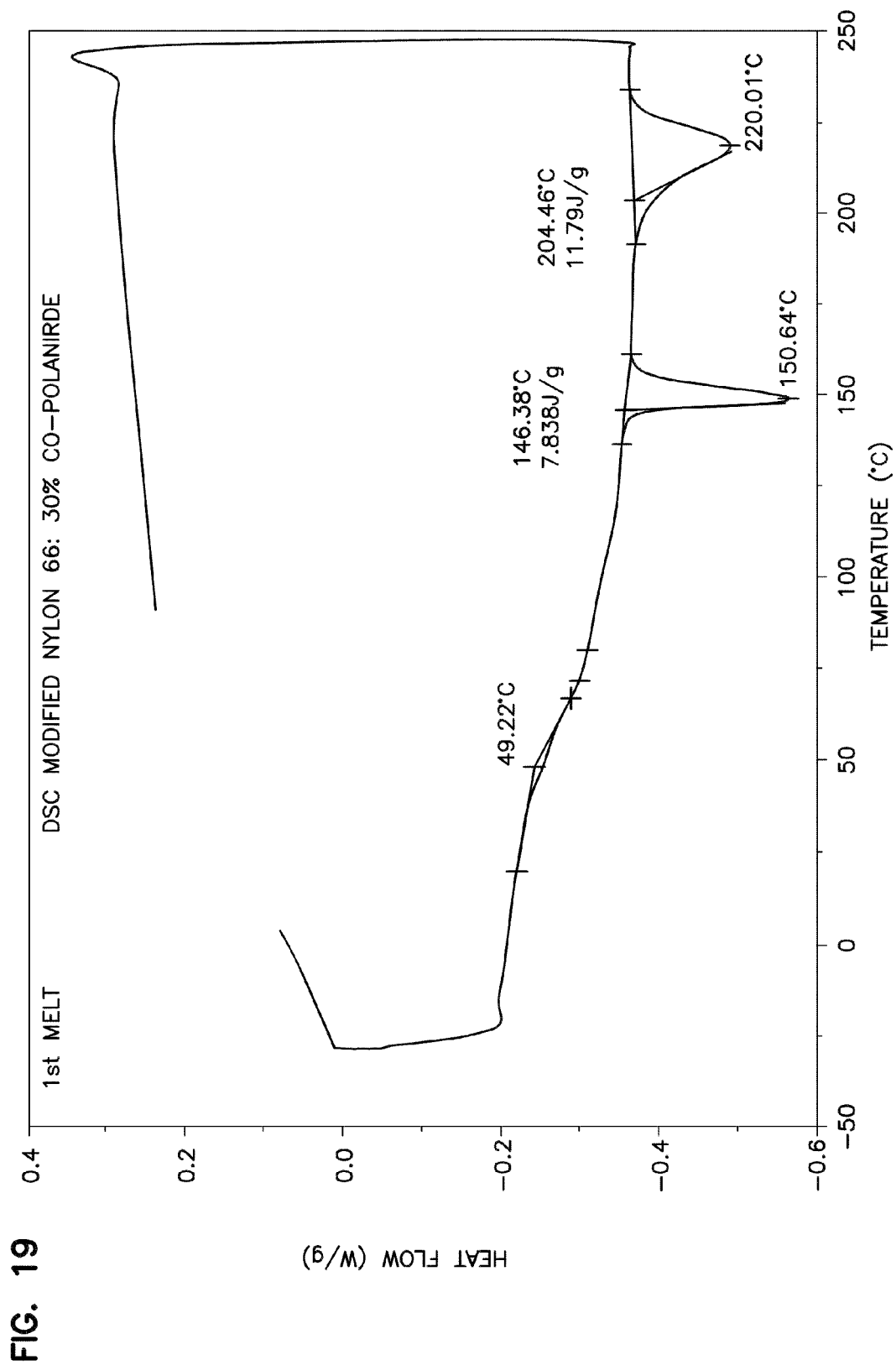
Figure 20:
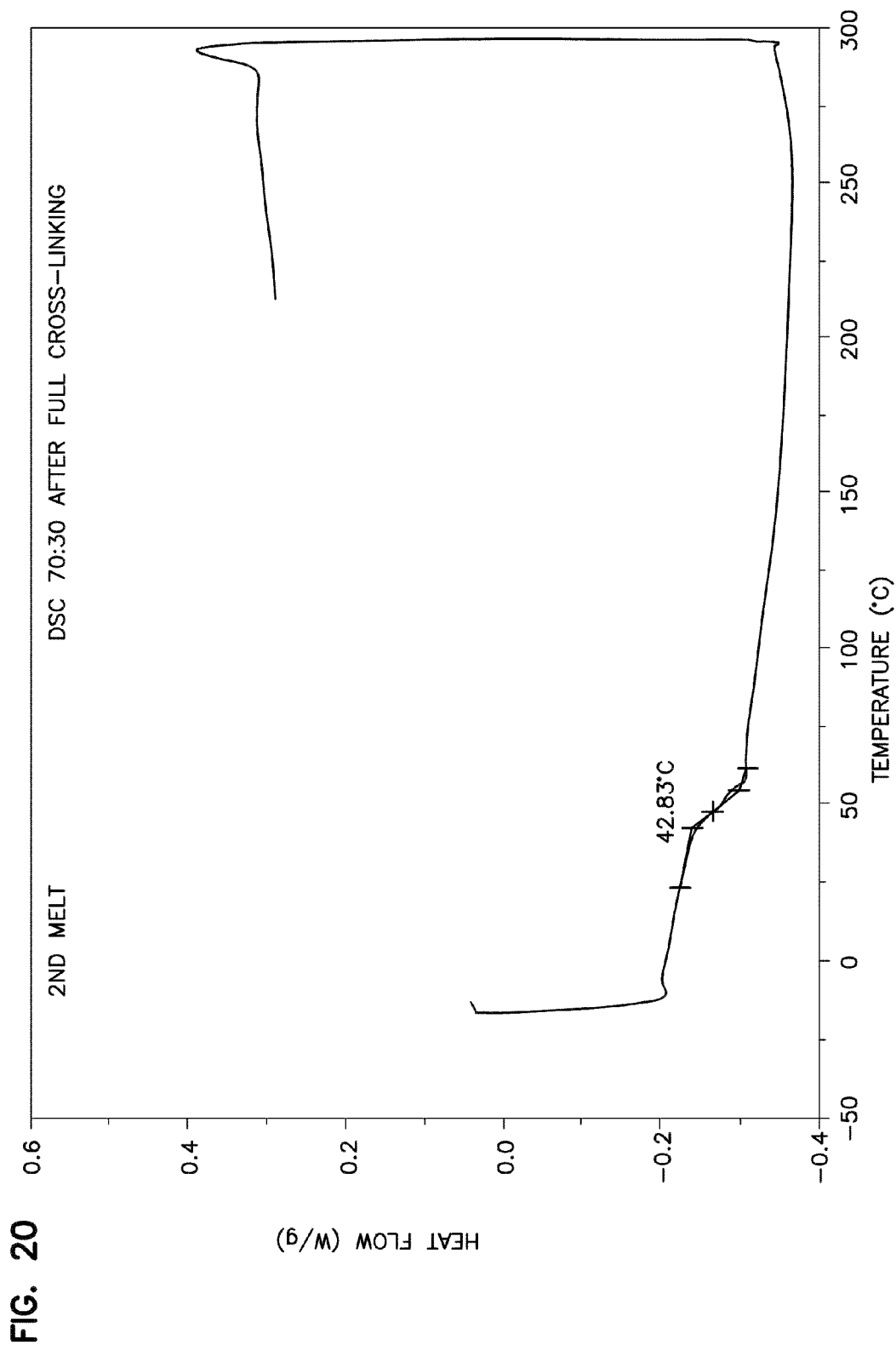

Thus formed alkoxy alkyl modified type 8 polyamide is dissolved in ethanol/water mixture. Polymer solution is electrospun in a manner described in Barris et al., U.S. Pat. No. 4,650,506. Polymer solution viscosity tends to increase with time. It is generally known that polymer viscosity has a great influence in determining fiber sizes. Thus, it is difficult to control the process in commercial scale, continuous production. Furthermore, under same conditions, type 8 polyamides do not form microfibers as efficiently as copolyamides. However, when the solution is prepared with addition of acidic catalyst, such as toluene sulfonic acid, maleic anhydride, trifluoro methane sulfonic acid, citric acid, ascorbic acid and the like, and fiber mats are carefully heat-treated after fiber formation, the resultant fiber has a very good chemical resistance. (FIG. 13). Care must be taken during the crosslinking stage, so that one does not destroy fibrous structure.

We have found a surprising result when type 8 polyamide (polymer B) is blended with alcohol soluble copolyamides. By replacing 30% by weight of alkoxy alkyl modified polyamide 66 with alcohol soluble copolyamide like SVP 637 or 651 (polymer A), Elvamide 8061, synergistic effects were found. Fiber formation of the blend is more efficient than either of the components alone. Soaking in ethanol and measuring filtration efficiency shows better than 98% filtration efficiency retention. THC bench testing showing comparable results with Type 8 polyamide alone. This type blend shows that we can obtain advantage of efficient fiber formation and excellent filtration characteristic of copolyamide with advantage of excellent chemical resistance of crosslinked type 8 polyamide. Alcohol soak test strongly suggests that non-crosslinkable copolyamide has participated in crosslinking to maintain 98% of filtration efficiency.

DSC (see FIGS. 17-20) of blends of polymer A and B become indistinguishable from that of polymer A alone after they are heated to 250° C. (fully crosslinked) with no distinct melt temperature. This strongly suggests that blends of polymer A and B are a fully integrated polymer by polymer B crosslinking with polymer A. This is a completely new class of polyamide.

Similarly, melt-blend poly (ethylene terephthalate) with poly(butylene terephthalate) can have similar properties. During the melt processing at temperatures higher than melt temperature of either component, ester group exchange occurs and inter polymer of PET and PBT formed. Furthermore, our crosslinking temperature is lower than either of single component. One would not have expected that such group exchange occur at this low temperature. Therefore, we believe that we found a new family of polyamide through solution blending of Type A and Type B polyamide and crosslinking at temperature lower than the melting point of either component.

When we added 10% by weight of t-butyl phenol oligomer (Additive 7) and heat treated at temperature necessary for crosslinking temperature, we have found even better results. We theorized that hydroxyl functional group of t-butyl phenol oligomers would participate in reaction with functional group of type 8 nylons. What we have found is this component system provides good fiber formation, improved resistance to high temperature and high humidity and hydrophobicity to the surface of fine fiber layers.

We have prepared samples of mixture of Polymer A and Polymer B (Sample 6A) and another sample of mixture of Polymer A, Polymer B and Additive & (Sample 6B). We then formed fiber by electrospinning process, exposed the fiber mat at 300° F. for 10 minutes and evaluated the surface composition by ESCA surface analysis.

TABLE 3

ESCA analysis of Samples 6A and 6B.

| | Composition (%) | |
|---|---|---|
| | Sample 6A | Sample 6B |
| Polymer A | 30 | 30 |
| Polymer B | 70 | 70 |
| Additive 7 | 0 | 10 |

| | Surface Composition | | | |
|---|---|---|---|---|
| | W/O Heat | W/Heat | W/O Heat | W/Heat |
| Polymer A&B (%) | 100 | 100 | 68.9 | 43.0 |
| Additive 7 | 0 | 0 | 31.1 | 57.0 |

Figure 4:
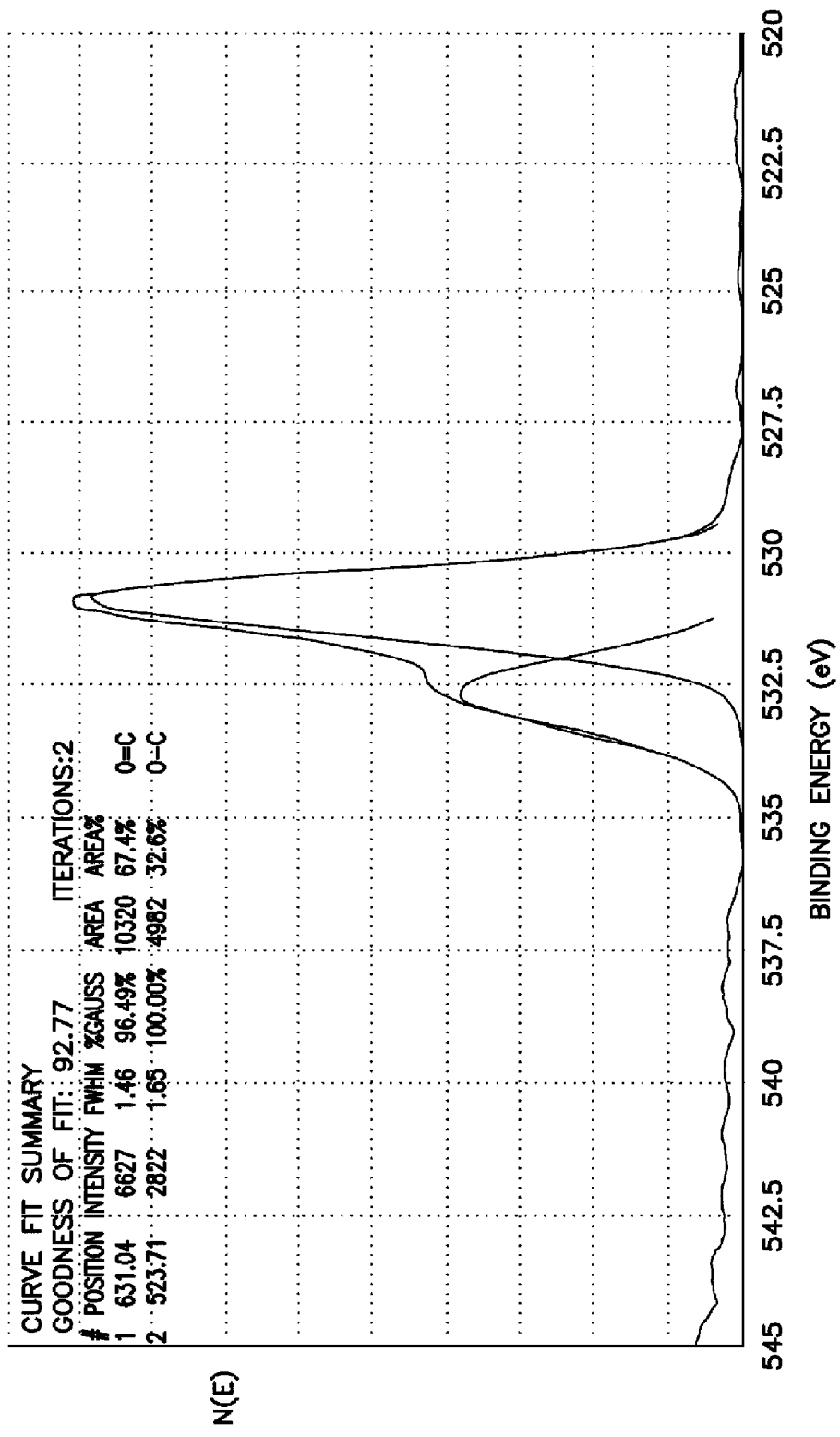
FIGS. 4 through 11 are analytical ESCA spectra relating to Example 13.
Figure 5:
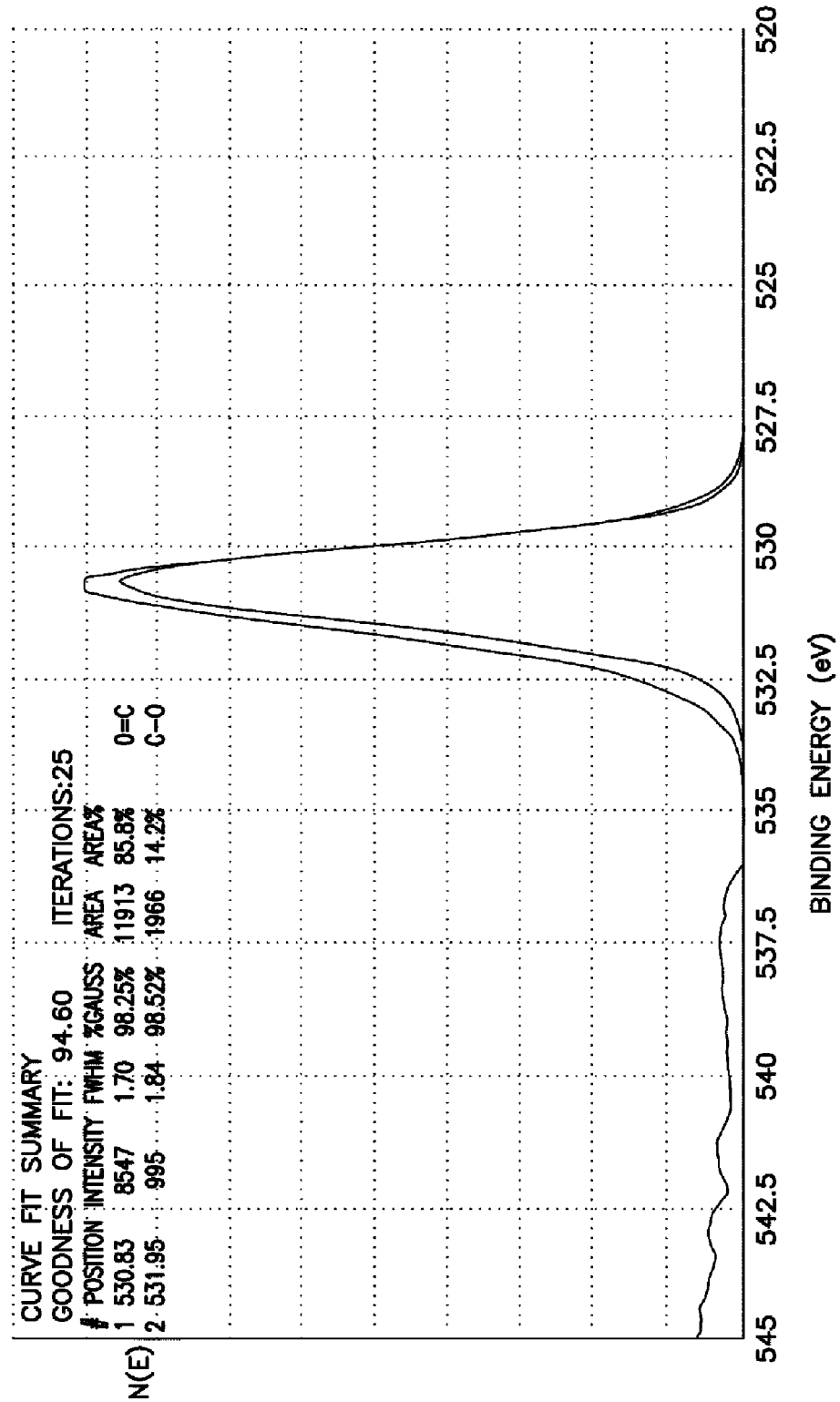
Figure 6:
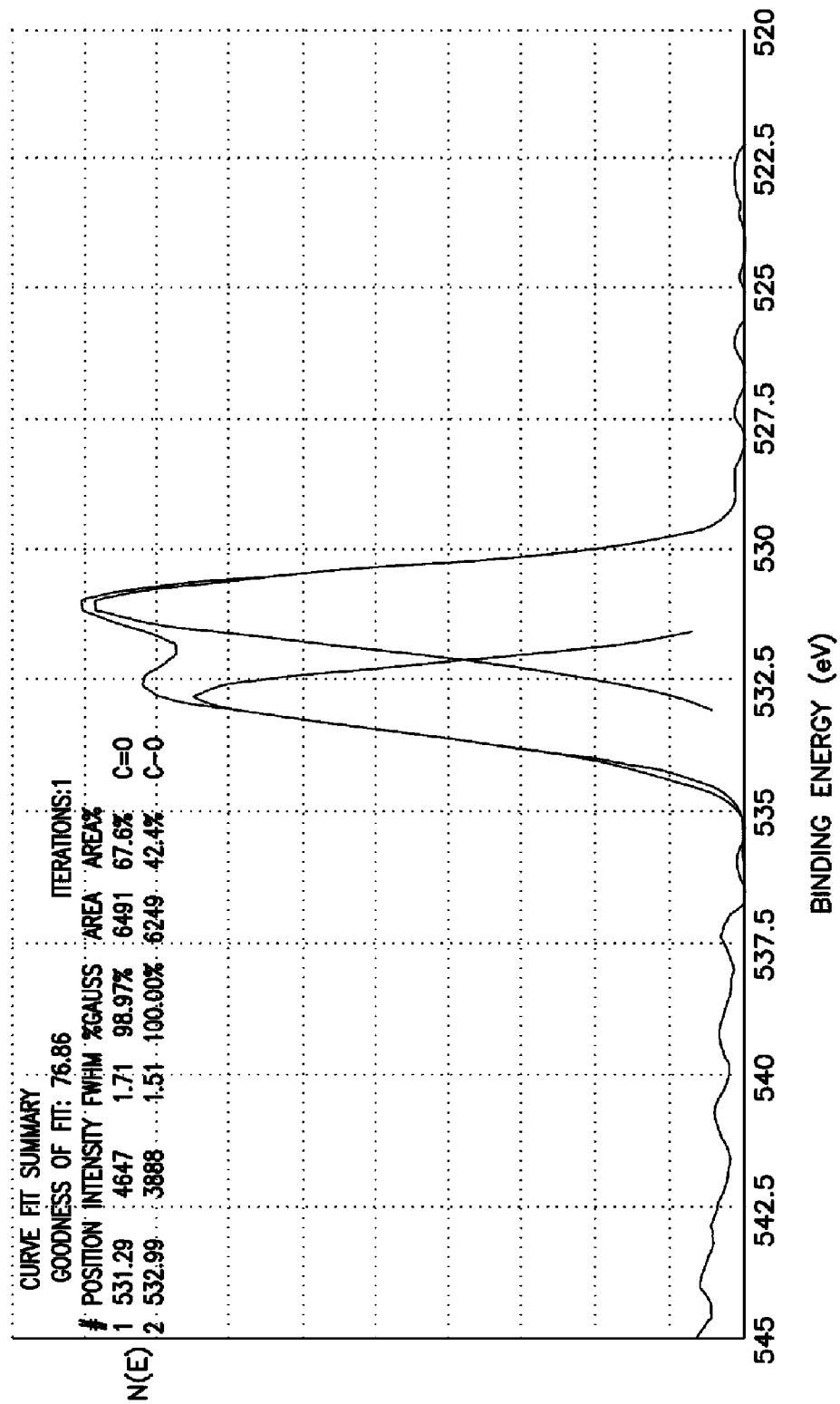
Figure 7:
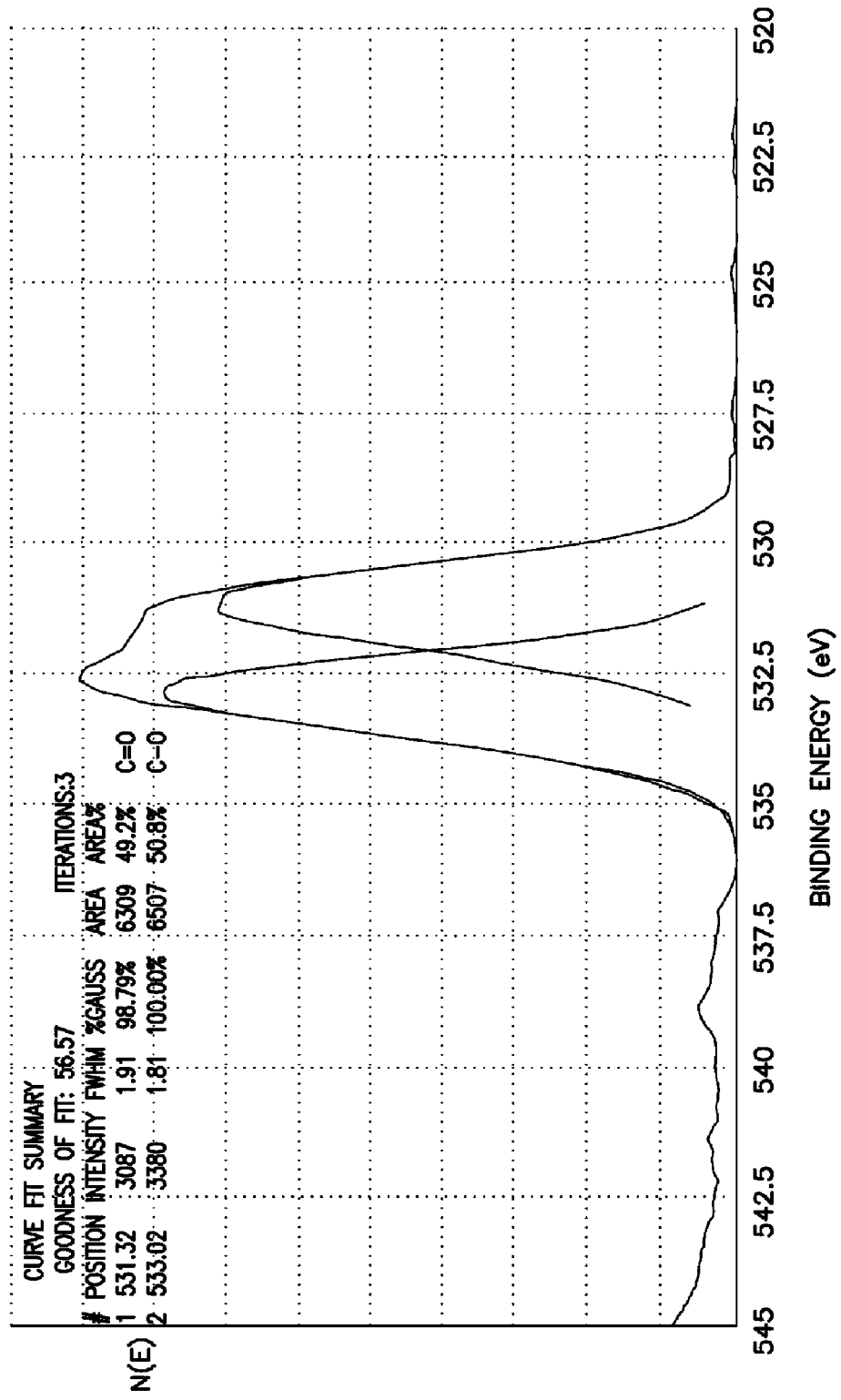
Figure 8:
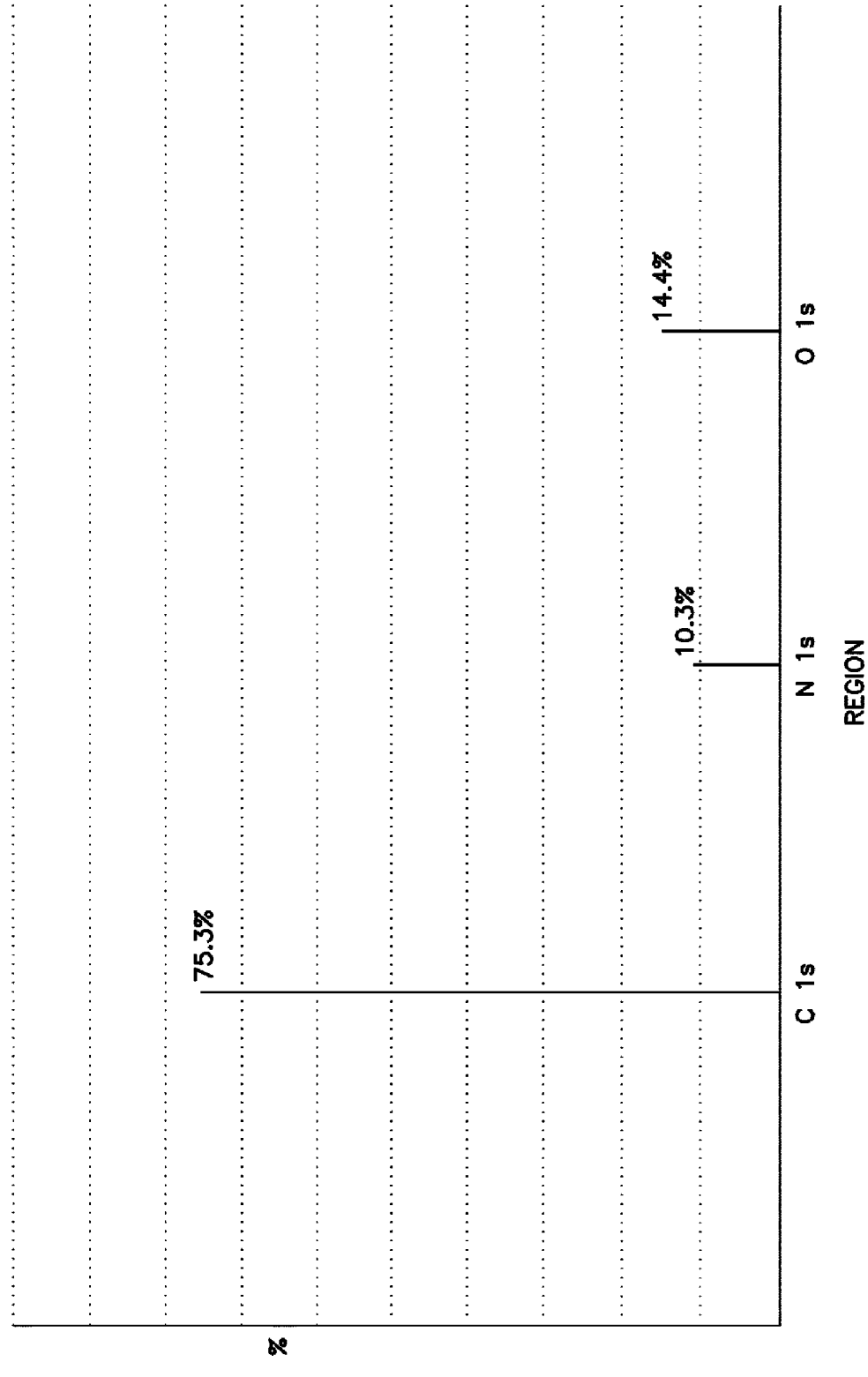
Figure 9:
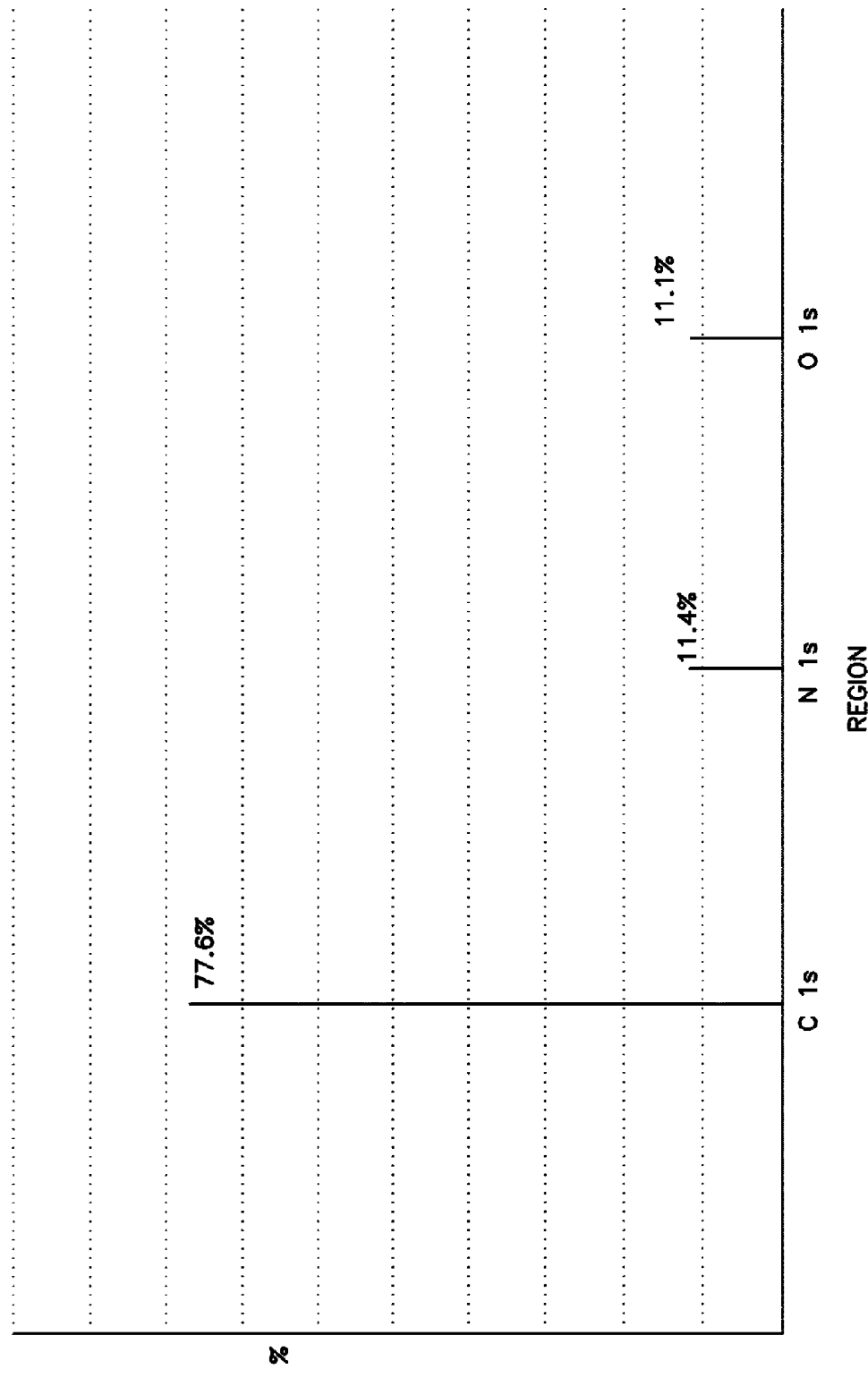
Figure 10:
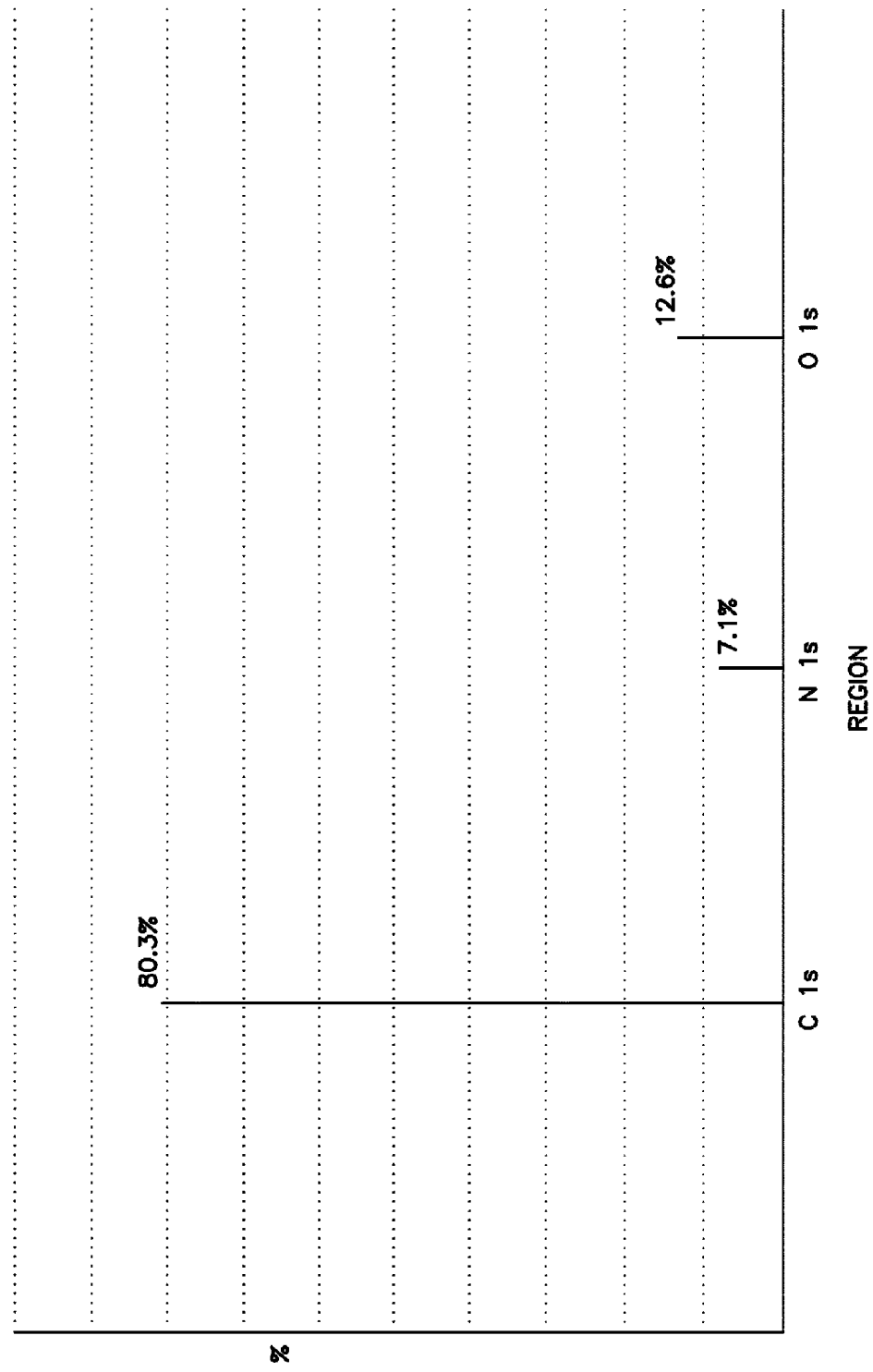
Figure 11:
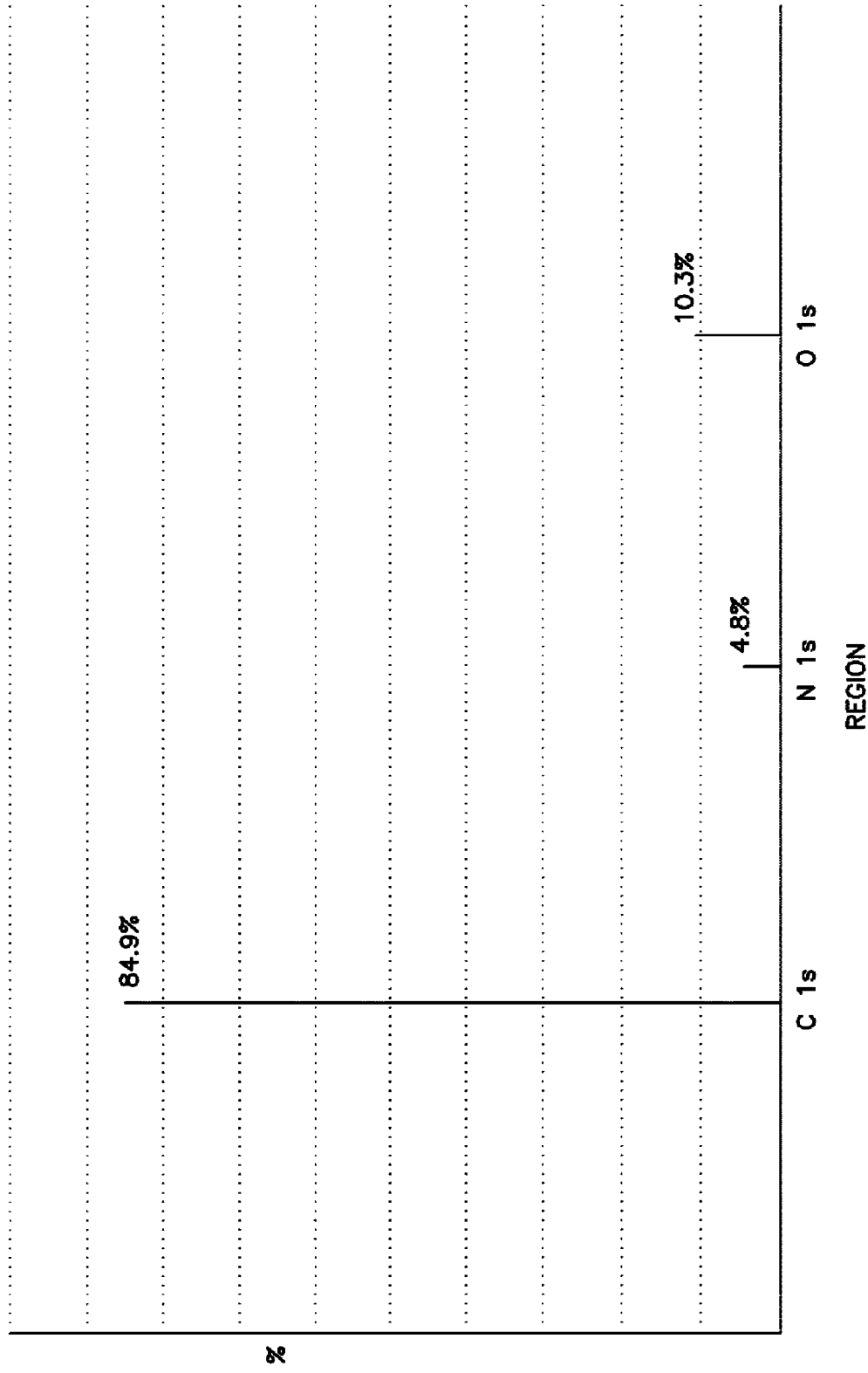

ESCA provides information regarding surface composition, except the concentration of hydrogen. It provides information on carbon, nitrogen and oxygen. Since the Additive 7 does not contain nitrogen, we can estimate the ratio of nitrogen containing polyamides and additive that does not contain nitrogen by comparing concentration of nitrogen. Additional qualitative information is available by examining O 1 s spectrum of binding energy between 535 and 527 eV. C═O bond has a binding energy at around 531 eV and C—O bond has a binding energy at 533 eV. By comparing peak heights at these two peaks, one can estimate relative concentration of polyamide with predominant C═O and additive with solely C—O groups. Polymer B has C—O linkage due to modification and upon crosslinking the concentration of C—O will decrease. ESCA confirms such reaction had indeed occurred, showing relative decrease of C—O linkage. (FIG. 4 for non heat treated mixture fiber of Polymer A and Polymer B, FIG. 5 for heat treated mixture fiber of Polymer A and Polymer B). When Additive 7 molecules are present on the surface, one can expect more of C—O linkage. This is indeed the case as can be seen in FIGS. 6 and 7. (FIG. 6 for as-spun mixture fibers of Polymer A, Polymer B and Additive 7. FIG. 7 for heat treated mixture fibers of Polymer A, Polymer B and Additive 7). FIG. 6 shows that the concentration of C—O linkage increases for Example 7. The finding is consistent with the surface concentration based on XPS multiplex spectrum of FIGS. 8 through 11.

It is apparent that t-butyl oligomer molecules migrated toward the surface of the fine fibers and form hydrophobic coating of about 50 Å. Type 8 nylon has functional groups such as —CH$_2$OH and —CH$_2$OCH$_3$, which we expected to react with —OH group of t-butyl phenol. Thus, we expected to see less oligomer molecules on the surface of the fibers. We have found that our hypothesis was not correct and we found the surface of the interpolymer has a thin coating.

Samples 6A, 6B and a repeat of sample described in Section 5 have been exposed THC bench at 160° F. at 100% RH. In previous section, the samples were exposed to 140° F. and 100% RH. Under these conditions, t-butyl phenol protected terpolymer copolyamide from degradation. However, if the temperature is raised to 160° F. and 100% RH, then the t-butyl phenol oligomer is not as good in protecting the underlying terpolymer copolyamide fibers. We have compared samples at 160° F. and 100% RH.

TABLE 4

Retained Fine Fiber Efficiency after Exposure to 160° F. and 100% RH

| Sample | After 1 Hr. | After 2 Hrs. | After 3 Hrs. |
|---|---|---|---|
| Sample 6A | 82.6 | 82.6 | 85.9 |
| Sample 6B | 82.4 | 88.4 | 91.6 |
| Sample 5 | 10.1 | | |

The table shows that Sample 6B helps protect exposure to high temperature and high humidity.

More striking difference shows when we exposed to droplets of water on a fiber mat. When we place a drop of DI water in the surface of Sample 6A, the water drops immediately spread across the fiber mat and they wet the substrate paper as well. On the other hand, when we place a drop of water on the surface of Sample 6B, the water drop forms a bead and did not spread on the surface of the mat. We have modified the surface of Sample 16 to be hydrophobic by addition of oligomers of p-t-butyl phenol. This type of product can be used as a water mist eliminator, as water drops will not go through the fine fiber surface layer of Sample 6B.

Samples 6A, 6B and a repeat sample of Section 5 were placed in an oven where the temperature was set at 310° F. Table shows that both Samples 6A and 6B remain intact while Sample of Section 5 was severely damaged.

TABLE 5

Retained Fine Fiber Efficiency after Exposure to 310° F.

| Sample | After 6 Hrs. | After 77 Hrs. |
|---|---|---|
| Sample 6A | 100% | 100% |
| Sample 6B | 100% | 100% |
| Sample 5 | 34% | 33% |

While addition of oligomer to Polymer A alone improved the high temperature resistance of fine fiber layer, the addition of Additive 7 has a neutral effect on the high temperature exposure.

We have clearly shown that the mixture of terpolymer copolyamide, alkoxy alkyl modified nylon 66 and oligomers of t-butyl phenol provides a superior products in helping fine fibers under severe environment with improved productivity in manufacturing over either mixture of terpolymer copolyamide and t-butyl phenol oligomer or the mixture of terpolymer copolyamide and alkoxy alkyl modified nylon 66. These two components mixture are also improvement over single component system.

Example 7

Compatible Blend of Polyamides and Bisphenol A Polymers

A new family of polymers can be prepared by oxidative coupling of phenolic ring (Pecora, A; Cyrus, W. U.S. Pat. No. 4,900,671 (1990) and Pecora, A; Cyrus, W.; Johnson, M. U.S. Pat. No. 5,153,298 (1992)). Of particular interest is polymer made of Bisphenol A sold by Enzymol Corp. Soybean Peroxidase catalyzed oxidation of Bisphenol A can start from either side of two —OH groups in Bisphenol A. Unlike Bisphenol A based polycarbonate, which is linear, this type of Bisphenol A polymer forms hyperbranched polymers. Because of hyperbranched nature of this polymer, they can lower viscosity of polymer blend.

We have found that this type of Bisphenol A polymer can be solution blended with polyamides. Reported Hansen's solubility parameter for nylon is 18.6. (Page 317, Handbook of Solubility Parameters and other cohesion parameters, A. Barton ed., CRC Press, Boca Raton Fla., 1985). If one calculates solubility parameter (page 61, Handbook of Solubility Parameters), then the calculated solubility parameter is 28.0. Due to the differences in solubility parameter, one would not expect that they would be miscible with each other. However, we found that they are quite miscible and provide unexpected properties.

50:50 blend of Bisphenol A resin of M.W. 3,000 and copolyamide was made in ethanol solution. Total concentration in solution was 10%. Copolyamide alone would have resulted in 0.2 micron fiber diameter. Blend resulted in lofty layer of fibers around 1 micron. Bisphenol A of 7,000 M.W. is not stable with copolyamide and tends to precipitate.

DSC of 50:50 blend shows lack of melting temperature. Copolyamide has melting temperature around 150° C. and Bisphenol A resin is a glassy polymer with Tg of about 100. The blend shows lack of distinct melting. When the fiber mat is exposed to 100° C., the fiber mat disappears. This blend would make an excellent filter media where upper use temperature is not very high, but low-pressure drop is required. This polymer system could not be crosslinked with a reasonable manner.

Example 8

Dual Roles of Bisphenol A Polymer as Solvent and Solid in Blend

A surprising feature of Bisphenol A polymer blend is that in solution form Bisphenol A polymer acts like a solvent and in solid form the polymer acts as a solid. We find dual role of Bisphenol A polymer truly unique.

The following formulation is made:

| | |
|---|---|
| Alkoxy alkyl modified PA 66: Polymer B | 180 g |
| Bisphenol A Resin (3,000 MW): Polymer C | 108 g |
| Ethanol 190 Grade | 827 g |
| Acetone | 218 8 |
| DI water | 167 g |
| Catalyst | 9.3 g |

The viscosity of this blend was 32.6 centipoise by Brookfield viscometer. Total polymer concentration was be 19.2%. Viscosity of Polymer B at 19.2% is over 200 centipoise. Viscosity of 12% polymer B alone in similar solvent is around 60 centipoise. This is a clear example that Bisphenol A resin acts like a solvent because the viscosity of the total solution was lower than expected. Resultant fiber diameter was 0.157 micron. If polymer B alone participated in fiber formation, the expected fiber size would be less than 0.1 micron. In other words, Polymer C participated in fiber formation. We do not know of any other case of such dramatic dual role of a component. After soaking the sample in ethanol, the filtration efficiency and fiber size was measured. After alcohol soak, 85.6% of filtration efficiency was retained and the fiber size was unchanged. This indicates that Polymer C has participated in crosslinking acting like a polymer solid.

Another polymer solution was prepared in the following manner:

| | |
|---|---|
| Alkoxy alkyl Modified PA66: Polymer B | 225 g |
| Bisphenol A Resin (3,000 MW): Polymer C | 135 g |
| Ethanol 190 Grade | 778 g |
| Acetone | 205 g |
| DI Water | 157 g |
| Catalyst | 11.6 g |

Viscosity of this blend was 90.2 centipoise. This is a very low viscosity value for 24% solid. Again, this is an indication Polymer C acts like a solvent in the solution. However, when they are electrospun into fiber, the fiber diameter is 0.438 micron. 15% solution of Polymer B alone would have produced around 0.2-micron fibers. In final state, Polymer C contributes to enlarging fiber sizes. Again, this example illustrates that this type of branched polymer acts as a solvent in solution and acts as a solid in final state. After soaking in ethanol solution, 77.9% of filtration efficiency was retained and fiber size was unchanged.

Example 9

Development of Crosslinked Polyamides/Bisphenol A Polymer Blends

Three different samples were prepared by combining resins, alcohols and water, stirring 2 hours at 60° C. The solution is cooled to room temperature and catalyst was added to solution and the mixture was stirred another 15 minutes. Afterward, viscosity of solution was measured and spun into fibers.

The following table shows these examples:

| Recipe (g) | Sample 9A | Sample 9B | Sample 9C |
|---|---|---|---|
| Polymer B | 8.4 | 12.6 | 14.7 |
| Polymer A | 3.6 | 5.4 | 6.3 |
| Polymer C | 7.2 | 10.8 | 12.6 |
| Ethanol 190 Grade | 89.3 | 82.7 | 79.5 |
| Isopropanol | 23.5 | 21.8 | 21.0 |
| DI Water | 18.0 | 16.7 | 15.9 |
| Catalyst | .45 | 0.58 | 0.79 |
| Viscosity (cP) | 22.5 | 73.5 | 134.2 |
| Fiber Size (micron) | 0.14 | 0.258 | 0.496 |

We have found out that this blend generates fibers efficiently, producing about 50% more mass of fiber compared to Polymer A recipe. In addition, resultant polymeric microfibers produce a more chemically resistant fiber. After alcohol soak, a filter made from these fibers maintained more than 90% filtration efficiency and unchanged fiber diameter even though inherently crosslinkable polymer is only 44% of the solid composition. This three-polymer composition of co-polyamide, alkoxy alkyl modified Nylon 66 and Bisphenol A creates excellent fiber forming, chemically resistant material.

Example 10

Alkoxy Alkyl Modified Co-Polymer of Nylon 66 and Nylon 46

In a 10-gallon high-pressure reactor, the following reactions were made, and resultant polymers were analyzed. After reaction temperature was reached, catalyst were added and reacted for 15 minutes. Afterward, the polymer solution was quenched, precipitated, washed and dried.

|  | Run 10A | Run 10B | Run 10C | Run 10D | Run 10E |
|---|---|---|---|---|---|
| Reactor Charge (LB) | | | | | |
| Nylon 4,6 (duPont Zytel 101) | 10 | 5 | 5 | 5 | 5 |
| Nylon 6,6 (DSM Stanyl 300) | 0 | 5 | 5 | 5 | 5 |
| Formaldehyde | 8 | 10 | 8 | 10 | 8 |
| DI Water | 0.2 | 0.2 | 2 | 0.2 | 2 |
| Methanol | 22 | 20 | 20 | 20 | 20 |
| Reaction Temp (° C.) | 140 | 140 | 140 | 150 | 150 |
| Tg (° C.) | 56.7 | 38.8 | 37.7 | 38.5 | 31.8 |
| Tm (° C.) | 241.1 | 162.3 | 184.9 | 175.4 | 189.5 |
| Level of Substitution | | | | | |
| Alkoxy (wt. %) | 11.9 | 11.7 | 7.1 | 11.1 | 8.4 |
| Methylol (wt %) | 0.14 | 0.13 | 0.14 | 0.26 | 0.24 |

DSC of the polymer made with Nylon 46 and Nylon 66 shows broad single melt temperature, which is lower than the melting temperature of modified Nylon 46 (241° C. or modified Nylon 66 (210° C. This is an indication that during the reaction, both components are randomly distributed along the polymer chain. Thus, we believe that we have achieved random copolymer of Nylon 46 and Nylon 66 with alkoxy alkyl modification. These polymers are soluble in alcohols and mixtures of alcohol and water.

| Property | ASTM | Nylon 6.6 | Nylon 4.6 |
|---|---|---|---|
| $T_m$ | | 265° C. | 295° C. |
| Tensile Strength | D638 | 13.700 | 8.500 |
| Elongation at Break | D638 | 15-80 | 60 |
| Tensile Yield Strength | D638 | 8000-12,000 | |
| Flexural Strength | D790 | 17,8000 | 11,500 |
| Tensile Modulus × $10^3$ psi | D638 | 230-550 | 250 |
| Izod Impact ft-lb/in of notch | D256A | 0.55-1.0 | 17 |
| Deflection Temp Under Flexural Load 264 psi | D648 | 158 | 194 |

Both are highly crystalline and are not soluble in common alcohols.
Source: Modern Plastics Encyclopedia 1998

Example 11

Development of Interpolymer of Coployamides and Alkoxyalkyl Modified Nylon 46/66 Copolymer and Formation of Electrospun Fibers Runs 10B and 10D samples were made into fibers by methods described in above. Alkoxy alkyl modified Nylon 46/66 (Polymer D) alone were successfully electrospun. Blending Polymer D with Polymer A brings additional benefits of more efficient fiber formation and ability to make bigger fibers without sacrificing the crosslinkability of Polymer D as can be seen in the following table:

|  | Polymer 10B | | Polymer 10D | |
|---|---|---|---|---|
|  | Alone | w/30% Polymer A | Alone | w/30% Polymer A |
| Fiber Size(micron) | 0.183 | 0.464 | 0.19 | 0.3 |
| Fiber Mass Ratio | 1 | 3 | 1 | 2 |
| Filtration Effi. Retention(%) | 87 | 90 | 92 | 90 |

Fiber Mass Ratio is calculated by (total length of fiber times cross sectional area). Filtration Efficiency Retention is measured soaking filter sample in ethanol. Fiber size was unchanged by alcohol soak.

Example 12

Crosslinked, Electrospun PVA

PVA powders were purchased from Aldrich Chemicals. They were dissolved either in water or 50/50 mixture of methanol and water. They were mixed with crosslinking agent and toluene sulfonic acid catalyst before electrospinning. The resulting fiber mat was crosslinked in an oven at 150° C. for 10 minutes before exposing to THC bench.

|  | Sample 12A | Sample 12B | Sample 12C | Sample 12D |
|---|---|---|---|---|
| PVA | | | | |
| Hydrolysis | 98-99 | 87-89 | 87-89 | 87-89 |
| M.W. | 31,500-50,000 | 31,500-50,000 | 31,500-50,000 | 31,500-50,000 |
| PVA Conc. (%) | 10 | 10 | 10 | 10 |
| Solvent | Water | Mixture | Mixture (c) | Mixture (d) |
| Other Polymer | None | None | Acrylic Acid | Cymel 385 |
| Other Polymer/ PVA (%) | 0 | 0 | 30 | 30 |
| % Fiber Retained THC, 1 hr. | 0 (a) | 0 (a, b) | 95 (b) | 20 (b) |
| % Fiber Retained THC, 3 hr. | | | 90 (a) | |

(a): Temperature 160° F., 100% humidity
(b): Temperature 140° F., 100% humidity
(c): Molecular Weight 2000
(d): Melamine formaldehyde resin from Cytec

Example 13

A conventional cellulose air filter media was used as the substrate. This substrate had a basis weight of 67 pounds per 3000 square feet, a Frazier permeability of 16 feet per minute at 0.5 inch of water pressure drop, a thickness of 0.012 inch, and a LEFS efficiency of 41.6%. A fine fiber layer of Example 1 was added to the surface using the process described with a nominal fiber diameter of 0.2 micron. The resulting composite had a LEFS efficiency of 63.7%. After exposure to 140 F air at 100% relative humidity for 1 hour the substrate only sample was allowed to cool and dry, it then had a LEFS efficiency of 36.5%. After exposure to 140 F air at 100% relative humidity for 1 hour the composite sample was allowed to cool and dry, it then had a LEFS efficiency of 39.7%. Using the mathematical formulas described, the fine fiber layer efficiency retained after 1 hour of exposure was 13%, the number of effective fine fibers retained was 11%.

Example 14

A conventional cellulose air filter media was used as the substrate. This substrate had a basis weight of 67 pounds per 3000 square feet, a Frazier permeability of 16 feet per minute at 0.5 inch of water pressure drop, a thickness of 0.012 inch, and a LEFS efficiency of 41.6%. A fine fiber layer of Example 5 was added to the surface using the process described with a nominal fiber diameter of 0.2 micron. The resulting composite had a LEFS efficiency of 96.0%. After exposure to 160° F. air at 100% relative humidity for 3 hours the substrate only sample was allowed to cool and dry, it then had a LEFS efficiency of 35.3%. After exposure to 160° F. air at 100% relative humidity for 3 hours the composite sample was allowed to cool and dry, it then had a LEFS efficiency of 68.0%. Using the mathematical formulas described, the fine fiber layer efficiency retained after 3 hours of exposure was 58%, the number of effective fine fibers retained was 29%.

Example 15

A conventional cellulose air filter media was used as the substrate. This substrate had a basis weight of 67 pounds per 3000 square feet, a Frazier permeability of 16 feet per minute at 0.5 inch of water pressure drop, a thickness of 0.012 inch, and a LEFS efficiency of 41.6%. A fine fiber layer of a blend of Polymer A and Polymer B as described in Example 6 was added to the surface using the process described with a nominal fiber diameter of 0.2 micron. The resulting composite had a LEFS efficiency of 92.9%. After exposure to 160° F. air at 100% relative humidity for 3 hours the substrate only sample was allowed to cool and dry, it then had a LEFS efficiency of 35.3%. After exposure to 160° F. air at 100% relative humidity for 3 hours the composite sample was allowed to cool and dry, it then had a LEFS efficiency of 86.0%. Using the mathematical formulas described, the fine fiber layer efficiency retained after 3 hours of exposure was 96%, the number of effective fine fibers retained was 89%.

Example 16

A conventional cellulose air filter media was used as the substrate. This substrate had a basis weight of 67 pounds per 3000 square feet, a Frazier permeability of 16 feet per minute at 0.5 inch of water pressure drop, a thickness of 0.012 inch, and a LEFS efficiency of 41.6%. A fine fiber layer of Polymer A, Polymer B, t-butyl phenol oligomer as described in Example 6 was added to the surface using the process described with a nominal fiber diameter of 0.2 micron. The resulting composite had a LEFS efficiency of 90.4%. After exposure to 160° F. air at 100% relative humidity for 3 hours the substrate only sample was allowed to cool and dry, it then had a LEFS efficiency of 35.3%. After exposure to 160° F. air at 100% relative humidity for 3 hours the composite sample was allowed to cool and dry, it then had a LEFS efficiency of 87.3%. Using the mathematical formulas described, the fine fiber layer efficiency retained after 3 hours of exposure was 97%, the number of effective fine fibers retained was 92%.

Example 17

A conventional cellulose air filter media was used as the substrate. This substrate had a basis weight of 67 pounds per 3000 square feet, a Frazier permeability of 16 feet per minute at 0.5 inch of water pressure drop, a thickness of 0.012 inch, and a LEFS efficiency of 41.6%. A fine fiber layer of crosslinked PVA with polyacrylic acid of Example 12 was added to the surface using the process described with a nominal fiber diameter of 0.2 micron. The resulting composite had a LEFS efficiency of 92.9%. After exposure to 160° F. air at 100% relative humidity for 2 hours the substrate only sample was allowed to cool and dry, it then had a LEFS efficiency of 35.3%. After exposure to 160° F. air at 100% relative humidity for 2 hours the composite sample was allowed to cool and dry, it then had a LEFS efficiency of 83.1%. Using the mathematical formulas described, the fine fiber layer efficiency retained after 2 hours of exposure was 89%, the number of effective fine fibers retained was 76%.

Example 18

The following filter medias have been made with the methods described in Examples 1-17.

| Filter Media Examples | | | | | |
|---|---|---|---|---|---|
| Substrate | Substrate perm (Frazier) | Substrate Basis wt (lbs/3000 sq ft) | Substrate Thickness (in) | Substrate Eff (LEFS) | Composite Eff (LEFS) |
| Single fine fiber layer on single substrate (flow either direction through media | (+/-10%) | (+/-10%) | (+/-25%) | (+/-5%) | (+/-5%) |
| Cellulose air filter media | 58 | 67 | 0.012 | 11% | 50% |
| Cellulose air filter media | 16 | 67 | 0.012 | 43% | 58% |
| Cellulose air filter media | 58 | 67 | 0.012 | 11% | 65% |
| Cellulose air filter media | 16 | 67 | 0.012 | 43% | 70% |
| Cellulose air filter media | 22 | 52 | 0.010 | 17% | 70% |
| Cellulose air filter media | 16 | 67 | 0.012 | 43% | 72% |
| Cellulose/synthetic blend with moisture resistant resin | 14 | 70 | 0.012 | 30% | 70% |
| Flame retardant cellulose air filter media | 17 | 77 | 0.012 | 31% | 58% |
| Flame retardant cellulose air filter media | 17 | 77 | 0.012 | 31% | 72% |

-continued

Filter Media Examples

| Substrate | Substrate perm (Frazier) | Substrate Basis wt (lbs/3000 sq ft) | Substrate Thickness (in) | Substrate Eff (LEFS) | Composite Eff (LEFS) |
|---|---|---|---|---|---|
| Flame retardant synthetic air filter media | 27 | 83 | 0.012 | | 77% |
| Spunbond Remay (polyester) | 1200 | 15 | 0.007 | 5% | 55% |
| Synthetic/ cellulose air filter media | 260 | 76 | 0.015 | 6% | 17% |
| Synthetic/glass air filter media | 31 | 70 | 0.012 | 55% | 77% |
| Synthetic/glass air filter media | 31 | 70 | 0.012 | 50% | 90% |
| Synthetic (Lutrador-polyester) | 300 | 25 | 0.008 | 3% | 65% |
| Synthetic (Lutrador-polyester) | | | 0.016 | | 90% |

Media has been used flat, corrugated, pleated, corrugated and pleated, in flatsheets, pleated flat panels, pleated round filters, and Z filters.

Test Methods

Hot Water Soak Test

Using filtration efficiency as the measure of the number of fine fibers effectively and functionally retained in structure has a number of advantages over other possible methods such as SEM evaluation.
  the filtration measure evaluates several square inches of media yielding a better average than the tiny area seen in SEM photomicrographs (usually less than 0.0001 square inch)
  the filtration measurement quantifies the number of fibers remaining functional in the structure. Those fibers that remain, but are clumped together or otherwise existing in an altered structure are only included by their measured effectiveness and functionality.

Nevertheless, in fibrous structures where the filtration efficiency is not easily measured, other methods can be used to measure the percent of fiber remaining and evaluated against the 50% retention criteria.

Description: This test is an accelerated indicator of filter media moisture resistance. The test uses the LEFS test bench to measure filter media performance changes upon immersion in water. Water temperature is a critical parameter and is chosen based on the survivability history of the media under investigation, the desire to minimize the test time and the ability of the test to discriminate between media types. Typical water temperatures are 70° F., 140° F. or 160° F.

Procedure:

A 4" diameter sample is cut from the media. Particle capture efficiency of the test specimen is calculated using 0.8 Tm latex spheres as a test challenge contaminant in the LEFS (for a description of the LEFS test, see ASTM Standard F1215-89) bench operating at 20 FPM. The sample is then submerged in (typically 140° F.) distilled water for 5 minutes. The sample is then placed on a drying rack and dried at room temperature (typically overnight). Once it is dry the sample is then retested for efficiency on the LEFS bench using the same conditions for the initial calculation.

The previous steps are repeated for the fine fiber supporting substrate without fine fiber.

From the above information one can calculate the efficiency component due only to the fine fiber and the resulting loss in efficiency due to water damage. Once the loss in efficiency due to the fine fiber is determined one can calculate the amount of efficiency retained.

Calculations:

Fine fiber layer efficiency: $E_i$=Initial Composite Efficiency;
  $E_s$=Initial Substrate Efficiency;
  $F_e$=Fine Fiber Layer
  $F_e$=1−EXP(Ln(1−$E_i$)−Ln(1−$E_x$))

Fine fiber layer efficiency retained: $F_i$=Initial fine fiber layer efficiency;
  $F_x$=Post soak fine fiber layer efficiency;
  $F_r$=Fine fiber retained $$F_r = F_x/F_i$$

The percentage of the fine fibers retained with effective functionality can also be calculated by:

$$\% = \log(1-F_x)/\log(1-F_i)$$

Pass/Fail Criteria: >50% efficiency retention

In most industrial pulse cleaning filter applications the filter would perform adequately if at least 50% of the fine fiber efficiency is retained.

THC Bench (Temperature, Humidity

Description: The purpose of this bench is to evaluate fine fiber media resistance to the affects of elevated temperature and high humidity under dynamic flow conditions. The test is intended to simulate extreme operating conditions of either an industrial filtration application, gas turbine inlet application, or heavy duty engine air intake environments. Samples are taken out, dried and LEFS tested at intervals. This system is mostly used to simulate hot humid conditions but can also be used to simulate hot/cold dry situations.

| | |
|---|---|
| Temperature | −31 to 390° F. |
| Humidity | 0 to 100% RH (Max temp for 100% RH is 160° F. and max continuous duration at this condition is 16 hours) |
| Flow Rate | 1 to 35 FPM |

Procedure:

A 4" diameter sample is cut from the media.

Particle capture efficiency of the test specimen is calculated using 0.8 Tm latex spheres as a test challenge contaminant in the LEFS bench operating at 20 FPM.

The sample is then inserted into the THC media chuck.

Test times can be from minutes to days depending on testing conditions.

The sample is then placed on a drying rack and dried at room temperature (typically overnight). Once it is dry the sample is then retested for efficiency on the LEFS bench using the same conditions for the initial calculation.

The previous steps are repeated for the fine fiber supporting substrate without fine fiber.

From the above information one can calculate the efficiency component due only to the fine fiber and the resulting loss in efficiency due to alcohol damage.

Once the loss in efficiency due to the fine fiber is determined one can calculate the amount of efficiency retained.

Pass/Fail Criteria: >50% efficiency retention

In most industrial pulse cleaning filter applications the filter would perform adequately if at least 50% of the fine fiber efficiency is retained.

Alcohol (Ethanol) Soak Test

Description: The test uses the LEFS test bench to measure filter media performance changes upon immersion in room temperature ethanol.

Procedure:

A 4" diameter sample is cut from the media. Particle capture efficiency of the test specimen is calculated using 0.8 Tm latex spheres as a test challenge contaminant in the LEFS bench operating at 20 FPM. The sample is then submerged in alcohol for 1 minute.

The sample is then placed on a drying rack and dried at room temperature (typically overnight). Once it is dry the sample is then retested for efficiency on the LEFS bench using the same conditions for the initial calculation. The previous steps are repeated for the fine fiber supporting substrate without fine fiber. From the above information one can calculate the efficiency component due only to the fine fiber and the resulting loss in efficiency due to alcohol damage. Once the loss in efficiency due to the fine fiber is determined one can calculate the amount of efficiency retained.

Pass/Fail Criteria: >50% efficiency retention.

The above specification, examples and data provide an explanation of the invention. However, many variations and embodiments can be made to the disclosed invention. The invention is embodied in the claims herein after appended.

We claim:

1. A filter media comprising a fine fiber layer and a filtration substrate layer, the fine fiber layer comprising a fiber size comprising a diameter of about 0.01 to 0.5 micron, the fine fiber comprising a polyvinylidene fluoride or comprising a copolymer comprising hexafluoropropylene and vinylidene fluoride, the layer having a thickness no greater than 30 microns and a basis weight of about 0.5 to 150 g-m$^{-2}$.

2. The media of claim 1 wherein after exposure to air at 140° F. and 100% relative humidity for 16 hours at least 50% of the fiber remains substantially unchanged for filtration.

3. The media of claim 1 wherein the fiber size comprises a diameter of 0.1 to 0.5 microns.

4. The media of claim 1 wherein the fiber size comprises a diameter of 0.01 to 0.2 microns.

5. The media of claim 1 wherein the filtration substrate layer comprises a woven or non-woven substrate.

6. The media of claim 5 wherein the non-woven substrate comprises a fiber selected from cellulose, glass, a synthetic polymer, metal, and combinations thereof.

7. The media of claim 1 wherein the substrate layer comprises spun bonded synthetic polymeric non-woven fabric.

* * * * *